(12) United States Patent
Yanai et al.

(10) Patent No.: US 8,959,122 B2
(45) Date of Patent: Feb. 17, 2015

(54) DATA PROCESSING DEVICE

(75) Inventors: Kosuke Yanai, Kokubunji (JP); Yasutsugu Morimoto, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 12/984,073

(22) Filed: Jan. 4, 2011

(65) Prior Publication Data

US 2011/0219045 A1 Sep. 8, 2011

(30) Foreign Application Priority Data

Mar. 8, 2010 (JP) ................................. 2010-050608

(51) Int. Cl.
 *G06F 17/30* (2006.01)
(52) U.S. Cl.
 CPC ....................................... *G06F 17/30* (2013.01)
 USPC .......................................... 707/805; 715/853
(58) Field of Classification Search
 CPC ...................... G06F 17/30274; G06F 17/30286
 USPC ......... 707/793, 797, 798, 802, 803, 807, 821, 707/829, 805; 715/853
 See application file for complete search history.

(56) References Cited

U.S. PATENT DOCUMENTS

| | | | |
|---|---|---|---|
| 6,289,359 B1 | 9/2001 | Ando et al. | |
| 6,397,223 B1 | 5/2002 | Kori | |
| 6,618,725 B1 | 9/2003 | Fukuda et al. | |
| 7,143,086 B2 | 11/2006 | Miyamoto et al. | |
| 7,318,063 B2* | 1/2008 | Brychell et al. | 715/234 |
| 8,010,909 B1* | 8/2011 | Hanson et al. | 715/853 |
| 8,024,353 B2* | 9/2011 | Kamiya | 707/778 |
| 2003/0101171 A1 | 5/2003 | Miyamoto et al. | |
| 2003/0123743 A1 | 7/2003 | Zandi et al. | |
| 2004/0267796 A1* | 12/2004 | Shimogori | 707/101 |
| 2006/0174189 A1* | 8/2006 | Weitzman et al. | 715/503 |
| 2007/0185904 A1 | 8/2007 | Matsuzawa et al. | |
| 2009/0030926 A1* | 1/2009 | Aharoni et al. | 707/102 |
| 2009/0254572 A1* | 10/2009 | Redlich et al. | 707/10 |
| 2010/0106752 A1* | 4/2010 | Eckardt et al. | 707/805 |

FOREIGN PATENT DOCUMENTS

| | | |
|---|---|---|
| JP | 11154155 | 6/1999 |
| JP | 2001022617 | 1/2001 |
| JP | 2001022766 | 1/2001 |
| JP | 2001043237 | 2/2001 |
| JP | 2001134575 | 5/2001 |
| JP | 2002197099 | 7/2002 |
| JP | 2003162545 | 6/2003 |
| JP | 2005085166 | 3/2005 |
| JP | 2006053724 | 2/2006 |

* cited by examiner

*Primary Examiner* — Greta Robinson
(74) *Attorney, Agent, or Firm* — Antonelli, Terry, Stout & Kraus, LLP.

(57) ABSTRACT

There is disclosed an interface enabling easy implementation of processing on hierarchical data, and a method facilitating comprehension of the structure, meaning, and format of hierarchical data. There is also disclosed a data processing device including a user interface portion receiving data with tuples each a combination of data of different types, and lists each a series of data of a same type, display data obtained by converting the data, and an instruction requesting processing from a user, and presenting the display data, data managing portion managing the hierarchical data, display-data generating portion generating the display data from the hierarchical data, and analyzing portion implementing the processing. Data is presented in a table format having rows displaying level names and attribute names, respectively. The generating portion samples data of each level of hierarchical data to extract an amount possible to present, and converts the data format.

17 Claims, 37 Drawing Sheets

| USER ID | ACTION | DATE | TIME | ACCELERATION IN x-AXIS DIRECTION | ACCELERATION IN y-AXIS DIRECTION | ACCELERATION IN z-AXIS DIRECTION |
|---|---|---|---|---|---|---|
| 10505 | TRAVEL | 2008/01/24 | 12:43:50 | 8.52 | 5.42 | 7.42 |
| 10505 | TRAVEL | 2008/01/24 | 12:43:54 | 7.25 | 6.45 | 4.52 |
| ... | ... | | ... | ... | ... | ... |
| 10505 | MEETING | 2008/01/24 | 15:12:50 | 0.15 | 0.54 | 0.22 |
| 10505 | MEETING | 2008/01/24 | 15:12:58 | 0.11 | 0.58 | 0.42 |
| ... | ... | | | | | ... |

FIG. 4

```
<user>
    <user-id>10505</user-id>
    <sessions>
        <session>
            <action>TRAVEL</action>
            <date>2008/01/24</date>
            <logs>
                <log>
                    <time>12:43:50</time>
                    <x>8.52</x><y>5.42</y><z>7.42</z>
                </log>
                <log>
                    <time>12:43:54</log>
                    <x>7.25</x><y>6.45</y><z>4.52</z>
                </log>
                ...
            </logs>
        </session>
        <session>
            <action>MEETING</action>
            <date>2008/01/24</date>
            <logs>
                <log>
                    <time>15:12:50</time>
                    <x>0.15</x><y>0.54</y><z>0.22</z>
                </log>
                <log>
                    <time>15:12:58</time>
                    <x>0.11</x><y>0.58</y><z>0.42</z>
                </log>
                ...
            </logs>
        </session>
        ...
    </sessions>
</user>
```

FIG. 5

```
                                         500
(10505
   [ (TRAVEL 2008/01/24
       [ (12:43:50  8.52  5.42  7.42)
         (12:43:54  7.25  6.45  4.52)
         ...
       ])
     (MEETING 2008/01/24
       [ (15:12:50  0.15  0.54  0.22)
         (15:12:58  0.11  0.58  0.42)
         ...
       ])
     ...
   ])
```

FIG. 10 file_user-id_0.txt

| ROW NO. | FILE CONTENTS |
|---|---|
| 1 | 10505 |
| 2 | 10501 |
| ... | ... |
| 15321 | 25825 |

~1000 file_time_0.txt

| ROW NO. | FILE CONTENTS |
|---|---|
| 1 | [ [12:43:50 12:43:54 ...] [15:12:50 15:12:58 ...] ...] |
| 2 | ... |
| ... | ... |
| 1021 | ... |

~1001 file_x_0.txt

| ROW NO. | FILE CONTENTS |
|---|---|
| 1 | [ [8.52 7.25 ...] [0.15 0.11 ...] ...] |
| 2 | ... |
| ... | ... |
| 2522 | ... |

~1002

```
                                                        ~2600
(10505
  [ (TRAVEL 2008/01/24
     [ (12:43:50  8.52  5.42  7.42)
       (12:43:54  7.25  6.45  4.52)
       ...
     ] )
    (MEETING 2008/01/24
     [ (15:12:50  0.15  0.54  0.22)
       (15:12:58  0.11  0.58  0.42)
       ...
     ] )
    ...
  ] )
```

```
                                                        ~2601
(10505
  [ (TRAVEL 2008/01/24  512
     [ (12:43:50  8.52  5.42  7.42)
       (12:43:54  7.25  6.45  4.52)
       ...
     ] )
    (MEETING 2008/01/24  743
     [ (15:12:50  0.15  0.54  0.22)
       (15:12:58  0.11  0.58  0.42)
       ...
     ] )
    ...
  ] )
```

```
(10505
    [ (TRAVEL 2008/01/24
        [ (12:43:50  8.52  5.42  7.42)
          (12:43:54  7.25  6.45  4.52)
          ...
        ])
      (MEETING 2008/01/24
        [ (15:12:50  0.15  0.54  0.22)
          (15:12:58  0.11  0.58  0.42)
          ...
        ])
      ...
    ])
```
2700

```
action mean ([x])
TRAVEL  10.3
MEETING  2.5
...
```
2701

```
(10505
   [ (TRAVEL 2008/01/24
       [ (12:43:50  8.52  5.42  7.42)
         (12:43:54  7.25  6.45  4.52)
         ...
       ])
     (MEETING 2008/01/24
       [ (15:12:50  0.15  0.54  0.22)
         (15:12:58  0.11  0.58  0.42)
         ...
       ])
     ...
   ])
```

```
TRAVEL  1012342
MEETING  321232
MEAL  5102
...
```

| | | |
|---|---|---|
| NEW ATTRIBUTE NAME | period | ~3300 |
| LEVEL TO ADD | session | ~3301 |
| F(x) = | time[−1] − time[0] | ~3302 |

[IMPLEMENT ATTRIBUTE ADDITION]~3303

FIG. 34

| EXTRACTION PROCESSING | | | | | | | | |
|---|---|---|---|---|---|---|---|---|
| user ADD ATTRIBUTE~2903 | | session COLLAPSE ADD ATTRIBUTE~2903 | | | log COLLAPSE ADD ATTRIBUTE~2903 | | | |
| ☐user-id AGGREGATE | ☐action AGGREGATE | ☐date AGGREGATE | ☐period AGGREGATE | ☐time AGGREGATE | ☐x AGGREGATE | ☐y AGGREGATE | ☐z AGGREGATE |
| 10505 | TRAVEL | 2008/01/24 | 512 | 12:43:50 | 8.52 | 5.42 | 7.42 |
| | | | | 12:43:54 | 7.25 | 6.45 | 4.52 |
| | | | | ... | ... | ... | ... |
| | MEETING | 2008/01/24 | 743 | 15:12:50 | 0.15 | 0.54 | 0.22 |
| | | | | 15:12:58 | 0.11 | 0.58 | 0.42 |
| | ... | | | ... | ... | ... | ... |
| 21220 | MEAL | 2008/05/02 | 128 | 12:11:15 | 5.21 | 1.11 | 4.24 |
| | | | | 12:11:16 | 5.22 | 1.02 | 4.30 |
| | | | | ... | ... | ... | ... |
| ... | | | | | | | |

```
                                                   4300
(10505
   [(TRAVEL 2008/01/24
      [(12:43:50  8.52  5.42  7.42)
       (12:43:54  7.25  6.45  4.52)
      ])
    (MEETING 2008/01/24
      [(15:12:50  0.15  0.54  0.22)
       (15:12:58  0.11  0.58  0.42)
      ])
   ])
```

DATA PROCESSING DEVICE

CROSS-REFERENCE TO RELATED APPLICATION

This application is related to U.S. application Ser. No. 12/814,721 filed on Jun. 14, 2010, the disclosure of which is hereby incorporated by reference.

CLAIM OF PRIORITY

The present application claims priority from Japanese patent application JP 2010-050608 filed on Mar. 8, 2010, the content of which is hereby incorporated by reference into this application.

FIELD OF THE INVENTION

The present invention relates to a data processing device, and particularly to a technique to perform high-speed data analysis on a large volume of hierarchical data and a technique to display a large volume of hierarchical data.

BACKGROUND OF THE INVENTION

Business enterprises and autonomous bodies retain large volumes of data such as those of operational logs and sensor data, and there are needs for extracting useful information from such large volume data. The development in the information technology has been increasing the volume of collected hierarchical data, e.g., Extensible Markup Language (XML) data. Thus, there are demands for a technique to perform at high speed a complex data analysis on a large volume of data having a hierarchical structure, and for a user interface technique used with such an analysis technique.

JP-A-2003-162545 discloses a technique to store information such as data start position in an index file in order to enable a fast data search and extract in/from a Comma Separated Values (CSV) file where data is stored in a tree structure.

JP-A-2002-197099 and JP-A-2001-22766 disclose techniques where data are retained in a way specialized for cross tabulation in order to enhance the speed of cross tabulations at desired levels.

JP-A-2001-43237 discloses a technique where each attribute value has an index representing its position in a file so as to enable fast search of a record having a specified value at a specified field.

JP-A-Hei 11 (1999)-154155 and JP-A-2001-22617 disclose a technique where data are stored in a file such that data of a same field are stored continuously in order to enhance the speed of a processing involving only a specific field.

JP-A-2006-053724 discloses a technique to search an XML document using a schema mapping specification between an XML document and a relational table.

JP-A-2005-085166 discloses a graphics display system and a method for effectively presenting information obtained by data mining.

JP-A-2001-134575 discloses a system that detects a frequently appearing pattern in a database including a set of tree-structured data, by using a candidate pattern as an object of an aggregate calculation.

SUMMARY OF THE INVENTION

However, the technique of JP-A-2003-162545 requires reading data of all the fields even when only data of a specific plurality of fields are necessary. The techniques of JP-A-2002-197099 and JP-A-2001-22766, which are specialized for cross tabulation, are not compatible with a processing of complex data analysis other than cross tabulation, and unable to process hierarchical data at high speed. The technique of JP-A-2001-43237 has a limitation that the processing speed can be enhanced only in the case of detecting a record and when the number of values each field can take is relatively small. In particular, this technique is unable to perform at high speed processing that involves values of a specific field of all the records, and to process at high speed hierarchical data. Similarly, the techniques of JP-A-Hei 11 (1999)-154155 and JP-A-2001-22617 are unable to process at high speed hierarchical data.

On the other hand, when tabulation processing is implemented on whole, large volume data according to the technique of JP-A-2006-053724, in which data is stored in the form of table, the processing entails a join processing and a group-by processing and thus a relatively long time is taken. The system and method of JP-A-2005-085166 are for presenting a result of data mining to a user, and there is not disclosed a user interface through which a user instructs to implement a data processing.

The system of JP-A-2001-134575, which is related to extraction of a pattern that frequently appears in data, is incapable of general data analysis processing such as that of addition of an attribute.

Thus, none of the above-described publications discloses a user interface that enables a user to easily implement a processing on a large volume of hierarchical data, or a data display method facilitating a user's comprehension of the structure, meaning, and format of data.

When a programmer describes a processing to be implemented on hierarchized data, or data having a hierarchical structure, such as that of XML, the complexity of the data structure makes the programmer take much time as well as tend to make errors, even where the programmer is proficient. Further, when the complexity of the structure of data is relatively high, even a person familiar with the data gets confused what attribute is located at what level. Therefore, there is required a user interface that enables a user to easily implement a processing on hierarchical data and facilitates a user's comprehension of the structure, meaning, and format of data. Further, in designing a user interface for use with a large volume of data, it is required to enable efficient data exchange between a large-scale data processing system at the server side as a back end and the user interface at the client side.

Further, none of the above-described techniques of the publications can perform at high speed complex data analysis processing on a large volume of hierarchical data. That is, when large volume data is processed using the techniques, the processing speed is restricted or bottlenecked by reading and writing of data. Hence, in processing of hierarchical data, it is required to reduce the amount of reading and writing of data performed, and to store the data such that each part of data that is involved in a particular processing is read continuously and in series.

In view of the above-described situations, this invention was developed to provide a user interface enabling a user to easily implement a processing on a large volume of hierarchical data and facilitates a user's comprehension of the structure, meaning, and format of a large volume of hierarchical data. This invention is also to provide a data processing device capable of performing a complex data analysis processing at high speed.

To attain the above object, the invention provides a data processing device including a user interface portion, a data managing portion, a display-data generating portion, and an analysis processing portion. The user interface portion receives hierarchical data, display data obtained by converting the hierarchical data, and an instruction requesting processing from the user, and presents the display data and a result of the processing to the user. The hierarchical data is data having a hierarchical structure with tuples and lists. Each of the tuples is a combination of data of different data types, and each of the lists is a series of data of a same data type. The data managing portion manages the hierarchical data. The display-data generating portion generates the display data by converting the hierarchical data. The analysis processing portion receives the instruction from the user interface portion and implements the analysis processing. The user interface portion presents the hierarchical data in a table format having a row to display names of respective levels and a row to display the names of attributes of the tuples. The display-data generating portion samples data of each level of the hierarchical data to extract a part of the hierarchical data by an amount possible to present on the user interface portion, and converts the data extracted by the sampling into the display data.

To attain the above object, the invention provides a data processing device including a memory portion, a processing portion, and a user interface portion. The memory portion stores hierarchical data and display data. The hierarchical data is data having a hierarchical structure with tuples and lists, and each of the tuples is a combination of data of different data types and each of the lists is a series of data of a same data type. The processing portion manages the hierarchical data, implements an analysis processing on the hierarchical data, and generates the display data from the hierarchical data. The user interface portion receives an instruction requesting the analysis processing, and presents the display data. The processing portion generates the display data in a table format having a row for presenting names of the levels of the tuples, a row for presenting names of attributes of the tuples, and rows for presenting the lists in correspondence with the names of the attributes. The processing portion is capable of controlling the number of rows of the lists presented in the table format.

The invention provides a data processing device wherein a user interface portion allows a user to make disappear a part of data at any desired level by an operation of the user.

The invention provides a data processing device wherein a user interface portion and an analysis processing portion are capable of implementing an analysis processing on only a part of data and immediately presenting a result thereof on the user interface portion, before implementing the analysis processing on an entirety of the data.

The invention provides a data processing device wherein a user interface portion is such that when an attribute addition processing is implemented, a column of a newly added attribute is automatically inserted in a table.

To attain the object, the invention provides a data processing device includes a hierarchization processing portion, a data division processing portion, and a memory portion. The hierarchization processing portion outputs hierarchical data and schema information, based on raw data. The hierarchical data is obtained by hierarchizing the raw data to have a hierarchical structure with tuples and lists, and each of the tuples is a combination of data of different data types and each of the lists is a series of data of a same data type. The schema information is indicative of a data structure of the hierarchical data. The data division processing portion outputs attribute data, based on the hierarchical data and the schema information. The attribute data is obtained by dividing the hierarchical data by attribute. The memory portion stores the schema information outputted from the hierarchization processing portion, and the attribute data outputted from the data division processing portion. The attribute data stored in the memory portion includes a group of files and a file name management table for managing names of the files, each of the files containing data of a single attribute.

To attain the above object, a preferable form of the invention provides a data processing device for processing data, which includes a hierarchical-data restoration processing portion and an analysis processing portion. The hierarchical-data restoration processing portion restores an original hierarchical structure of hierarchical data, based on a data analysis script describing a data analysis processing, schema information representative of a data structure of the hierarchical data to be reconstructed, and attribute data which are data of respective attributes, and outputs the reconstructed hierarchical data. The analysis processing portion implements the data analysis processing based on the data analysis script and the reconstructed hierarchical data. The hierarchical structure to be restored is recursive with tuples and lists, with each of the tuples being a combination of data of different data types, and each of the lists being a series of data of a same data type. The schema information holds data types of respective elements of the hierarchical structure to be restored. As to the data types of the elements of each of the lists, the schema information contains the data type of only a first appearing one of the elements. The attribute data includes a group of files and a file name management table for managing names of the files. Each of the files contains data of a single attribute, and the data of the attribute contained in each file is hierarchized in a list structure, in accordance with a depth of the attribute in list nesting of the schema information. The group of files is such that files of each same attribute are ordered such that when files of two given attributes are respectively sequentially opened in the predetermined order and the data contained therein are read in units of an appropriate amount, correspondence between data of the two attributes in the hierarchical data can be restored. In a hierarchical-data restoration processing by the hierarchical-data restoration processing portion, an attribute whose data required in a data analysis processing is identified, and the files of the other attributes not required in the data analysis processing are not read. The data hierarchized in the list structure and read from the files is altered in its data structure by a transposition processing with the depth designated at which the transposition processing is to be implemented. In the hierarchical data thus reconstructed, the values of the attributes not required in the data analysis processing take an arbitrary value.

According to the invention, a user interface enabling a user to easily implement a processing on a large volume of hierarchical data is provided. Since the user interface of the invention presents a user a large volume of hierarchical data with the names of levels and the names of attributes in a way to facilitate user's comprehension, the user can easily comprehend the structure, meaning, and the format of the data. Further, since the user interface allows a user to make disappear apart of hierarchical data at any desired level, the user can easily comprehend the hierarchical structure of the data.

BRIEF DESCRIPTION OF THE DRAWINGS

FIG. 3 shows one example of raw data processed by the apparatus;

FIG. 4 shows hierarchical data in XML format as one example of expression of hierarchical data, in the second embodiment;

FIG. 5 shows one example of hierarchical data in the second embodiment;

FIG. 10 shows contents of files containing attribute values in the second embodiment;

FIG. 34 shows one example of the window in a state where a test implementation of an attribute addition processing is completed;

FIG. 43 show one example of data after subjected to sampling in the first embodiment.

DETAILED DESCRIPTION OF THE PREFERRED EMBODIMENTS

Figure 1:
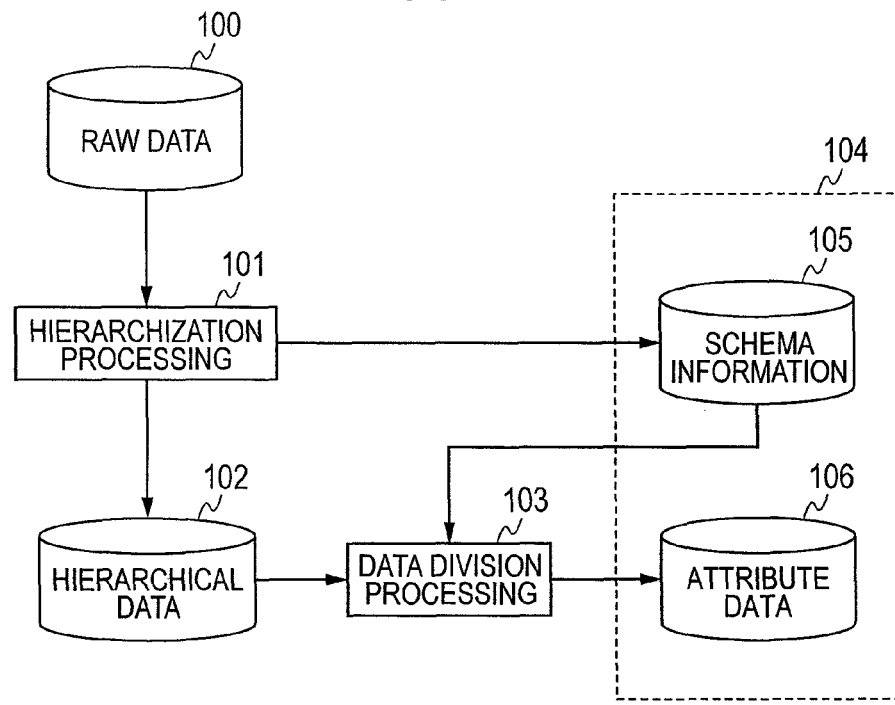
FIG. 1 is a block diagram of a first unit of a data processing device according to a second embodiment of the invention. The unit preprocesses data to convert into a format manageable on a computer.

Hereinafter, there will be described several embodiments of the invention, by referring to the drawings. It is noted that in the description below a function realized by a program in a processing portion of a data processing device such as computer may be referred to as some processing, some portion, or some means. For instance, a function to hierarchizing data may be referred to as "hierarchization processing", "hierarchizing portion", or "hierarchizing means".

First Embodiment

The first embodiment takes the form of a data processing device having a user interface that is suitable for use with a group of computers that are to implement data analysis processing on hierarchical data.

Figure 24:
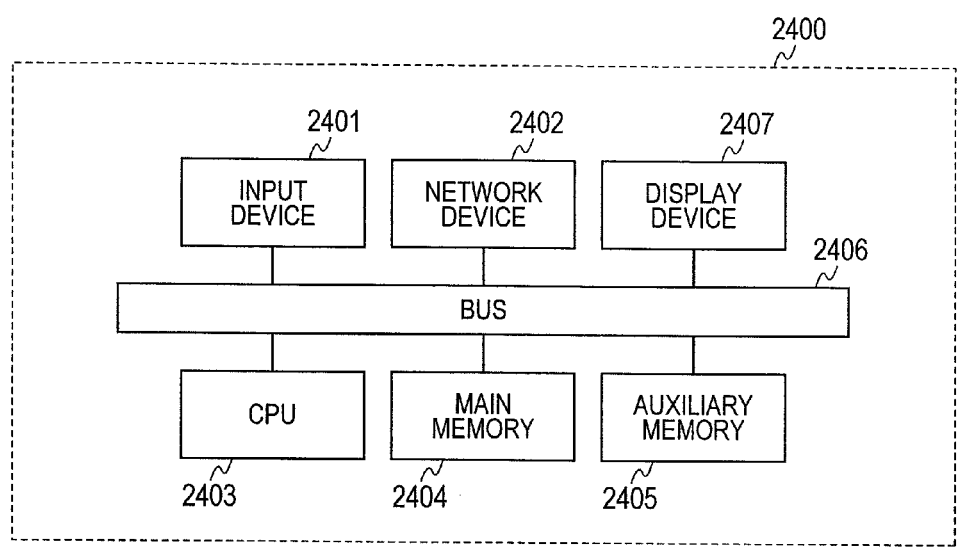
FIG. 24 is a diagram of a computer in the first to third embodiments.

There will be described the data processing device of the first embodiment. It is noted that the computers used in the data processing device of the first embodiment is of general-purpose type and may be one having a structure shown in FIG. 24, for instance. Referring briefly to FIG. 24, reference numeral 2400 denotes a computer, which includes an input device 2401 as an input portion, a network device 2402 as a network interface portion through which the computer is connected to a network such as the Internet, a central processing unit (CPU) 2403 as a processing portion, main and auxiliary memory portions 2404, 2405 as a memory portion, a display device 2407 as an output portion, and an internal bus 2406 with which the members 2401 to 2405 and 2407 are connected. The input device 2401 may be a keyboard and/or a mouse. The input device 2401 and the display device 2407 cooperate to constitute a user interface portion. The CPU 2403 implements various processing by executing a program or programs that may be stored in the memory portion, or downloaded. The various processing will be described below.

Figure 25:
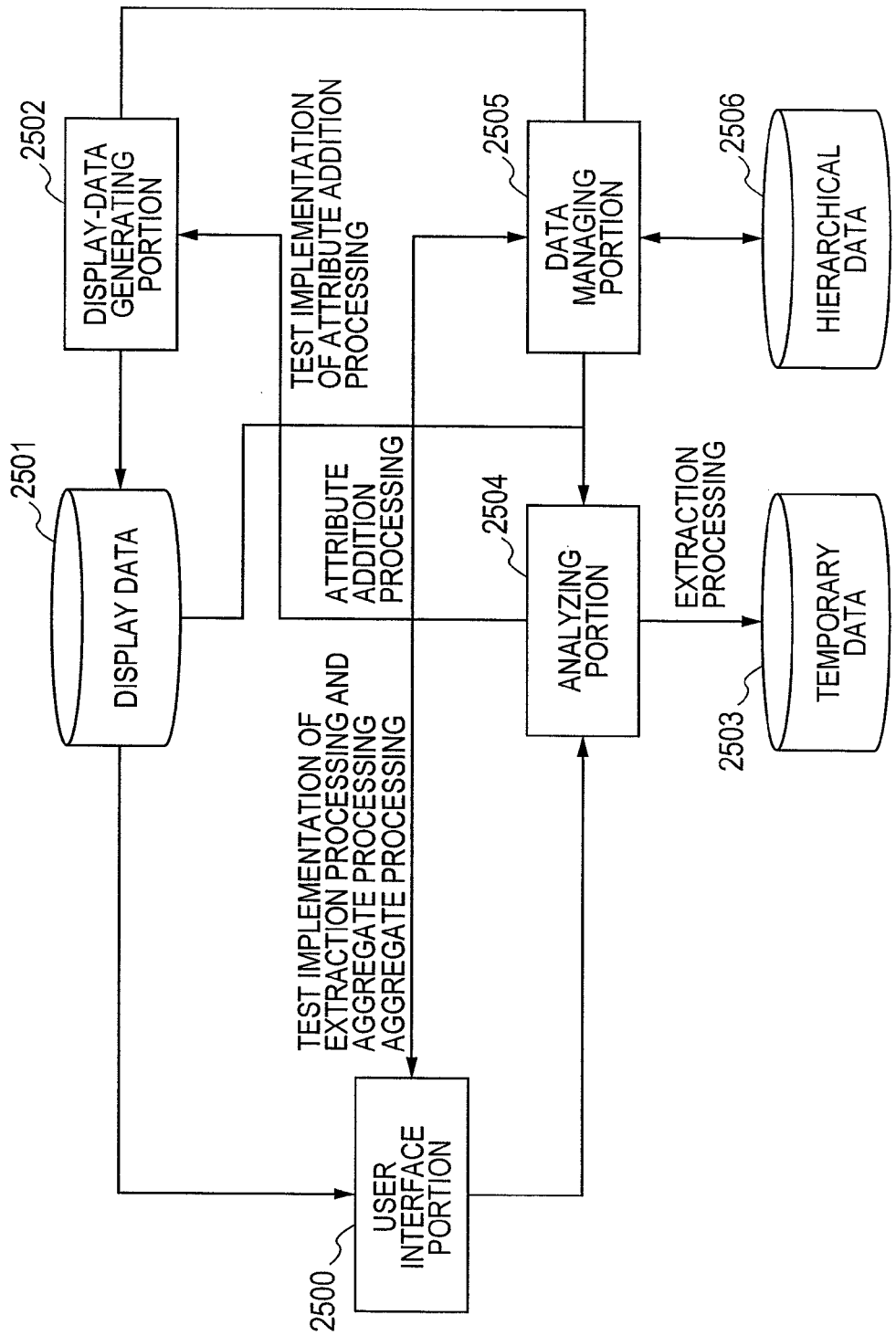
FIG. 25 is a block diagram of a data processing device according to a first embodiment of the invention.

FIG. 25 is a functional block diagram of one example of the data processing device of the first embodiment. In FIG. 25 is shown merely data flow, and detailed description of the data exchange among the functional blocks shown in FIG. 25 will be provided later by referring to FIGS. 35, 38, and 41. In FIG. 25, reference numerals 2500, 2502, 2504, and 2505 respectively denote the user interface portion, a display-data generating portion, an analyzing portion, and a data managing portion. The portions 2500, 2502, 2504, and 2505 are partly or entirely realized as program processing by the CPU 2403. The user interface portion 2500 includes hardware bodies of the input device 2401 and the display device 2407 shown in FIG. 24. The other part of the user interface portion 2500, and the display-data generating portion 2502, the analyzing portion 2504, and the data managing portion 2505 may be implemented in a same computer or in a plurality of computers. It is not essential that the user interface portion 2500 includes as a part thereof the input device 2401 such as a mouse and the display device 2407 such as a display, but the user interface portion 2500 may be connected to the hardware bodies of these devices 2401, 2407.

Display data 2501, extracted temporary data 2503, and hierarchical data 2506 which is a large volume of data having a hierarchical structure, are accumulated and stored in a memory portion such as the main memory portion 2404 and the auxiliary memory portion 2405. The display data 2501, the extracted temporary data 2503, and the hierarchical data 2506 may be accumulated and stored in a same computer, or may be accumulated and stored in a plurality of computers.

Hereinafter, there will be described formats of data processed and displayed by the data processing device of the first embodiment.

It is noted that although XML data 400 shown in FIG. 4 will be described as one example of the hierarchical data 2506, the first embodiment is equally applicable to other data. The XML data 400 represents a log of an acceleration sensor attached on the body of a user. The log contains values of the following attributes: user ID, action, date, time, acceleration in an x-axis direction, acceleration in a y-axis direction, and acceleration in a z-axis direction. Tags for these attributes are respectively "user-id", "action", "date", "time", "x", "y", "z". Although data for only one user is shown in FIG. 4, there are data for a plurality of users.

Referring to FIG. 5, reference numeral 500 denotes data obtained by replacing XML tags in the data 400 shown in FIG. 4 with round and square brackets. More specifically, data constituted by a combination of data (or elements) of different types is enclosed in a pair of round brackets, and data where data (or elements) of a same type repeatedly appear is enclosed in a pair of square brackets. Hereinafter, the former and latter data sets may be referred to as a tuple and a list, respectively. In the specific example of FIG. 5, the hierarchical structure expressed with lists and tuples are represented using round and square brackets. However, the hierarchical structure expressed with lists and tuples can be represented in various other ways including use of XML.

Figure 6:
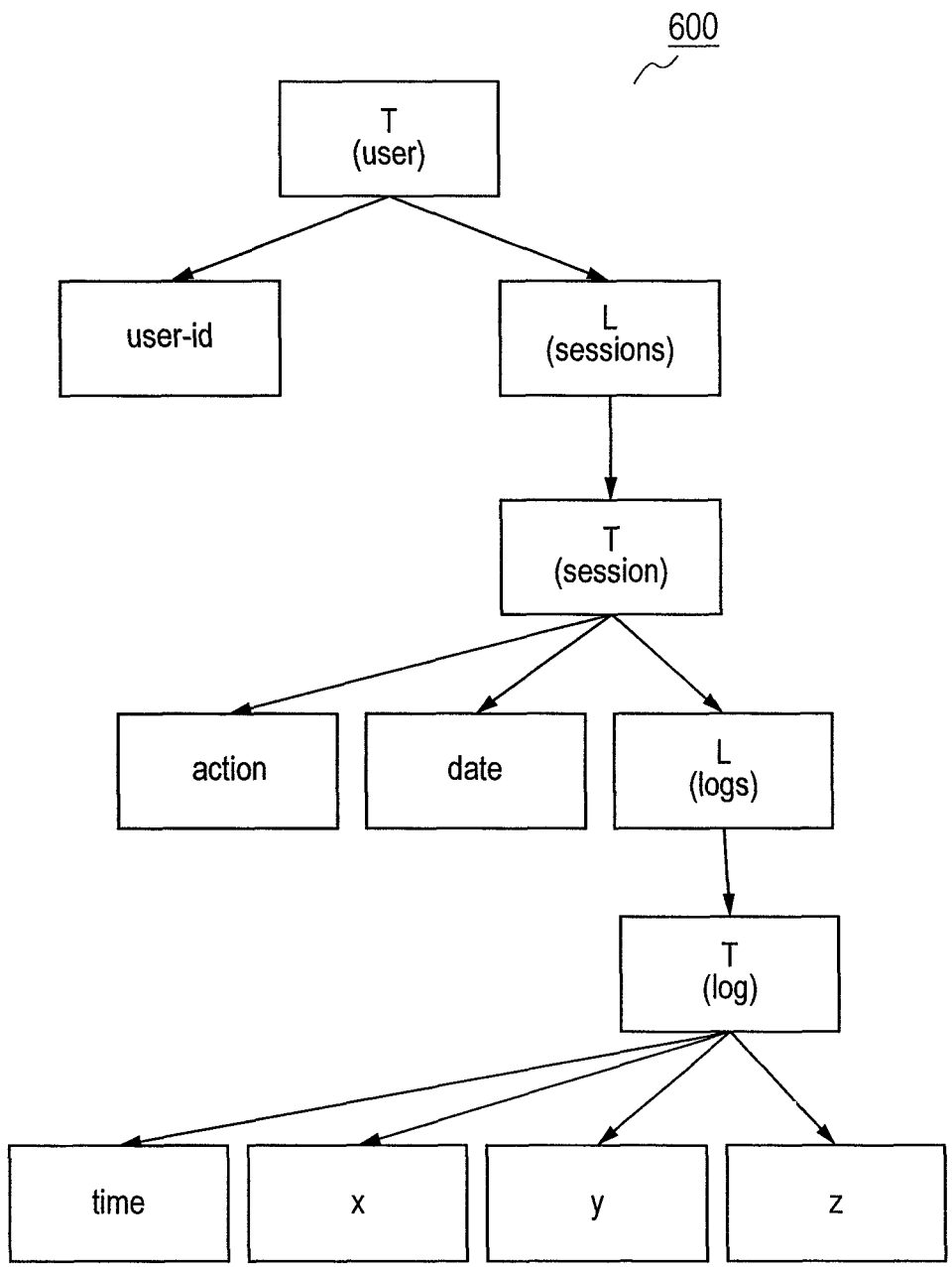
FIG. 6 is a schematic view of a data structure in the second embodiment.

The structure of a part of the data 500 (shown in FIG. 5) that corresponds to data for one user is schematically shown in FIG. 6, and is denoted by reference numeral 600. In FIG. 6, reference letters T and L represent a tuple and a list, respectively. The name of each node or square block corresponds to the name of a counterpart XML tag in the XML data 400 (shown in FIG. 4). In each list, data or elements of a same data type repeatedly appear. That is, a list is a series of elements that are of a same data type. Hence, FIG. 6 shows only one of the elements in each list that appears first in the list, below the block of the list, with letter "T" indicative of a tuple. The other elements following the shown one in each list are not shown in FIG. 6. In the first embodiment, data processing and presentation are performed on the data 600 of FIG. 6 that is hierarchically or recursively represented using lists and tuples.

The data 600 has three hierarchical levels, the first or highest one of which is a "user" level, and the second and the third of which are a "session" and a "log" level. At the "user" level, "user-id" data and "sessions" data or a list of "session" data are present. At the "session" level are "action" data, "date" data, and "logs" data or a list of "log" data. At the "log" level are "time" data, an "x" data, "y" data, and "z" data. The data processing device of the first embodiment can implement attribute addition processing, extraction processing, and aggregate processing.

Figure 26:
FIG. 26 shows one example of an attribute addition processing assumed to be implemented in the data processing device of the first embodiment.

FIG. 26 illustrates one example of attribute addition processing implemented by the data processing device of the first embodiment. Reference numeral 2600 denotes hierarchical data identical with that shown in FIG. 5 by way of example, and reference numeral 2601 denotes data obtained as a result of the attribute addition processing. In the example shown in FIG. 26, the attribute addition processing is such that the number of "log" tags (more specifically, the number of pairs of "log" tags since each "log" data has an opening tag and a closing tag) is counted for each of "session" tags (more specifically, "session" tag pairs since each "session" data has an opening and a closing tag) in the XML data 400 shown in FIG. 4, and the thus obtained number of "log" tag pairs is added as the value of a newly added attribute to the "session" level of the data 2600, to obtain data 2601 as shown in FIG. 26. In FIG. 26, the added attribute values are presented with underline in the data 2601. The apparatus according to the present embodiment can implement any other attribute addition processing than that shown in FIG. 26, as long as the processing can be implemented by a program.

Figure 27:
FIG. 27 shows one example of extraction processing assumed to be implemented in the data processing device of the first embodiment.

FIG. 27 illustrates one example of extraction processing implemented by the data processing device of the first embodiment. Reference numeral 2700 denotes hierarchical data identical with that shown in FIG. 5 by way of example, and reference numeral 2701 denotes data obtained as a result of the extraction processing. In the example shown in FIG. 27, the extraction processing is such that in the XML data 400 of FIG. 4 a pair of data representative of the value of each "action" tag and data representative of the mean of the values of the "x" tags at the "session" level, i.e., the mean of the values of the "x" tags within the "action" tag pair, is obtained, and the thus obtained data pairs 2701 for all the "action" tags are outputted. The data 2701 outputted as the result of the extraction processing may be temporarily stored in a storage device, to be used by another analysis program such as spreadsheet software, or to be copied to another computer so as to be used therein. The apparatus according to the present embodiment can implement any other extraction processing than that shown in FIG. 27, as long as the processing can be implemented by a program.

Figure 28:
FIG. 28 shows one example of an aggregate processing assumed to be implemented in the data processing device of the first embodiment.

FIG. 28 illustrates one example of aggregate processing that may be implemented by the data processing device of the first embodiment. Reference numeral 2800 denotes hierarchical data identical with that shown in FIG. 5 by way of example, and reference numeral 2801 denotes data obtained as a result of the aggregate processing. In the example of FIG. 28, the frequency at which each value of the "action" tag appears in the XML data 400 of FIG. 4 is calculated and outputted. For instance, in the example of 2801, the number of sessions in which a value "travel" appears in the "action" tags totals 1012342. According to the present embodiment, not only the example shown in FIG. 28 but any aggregate processing that a program can implement is possible.

Referring back to FIG. 25, there will be described in detail the functional structure of the data processing device of the first embodiment.

The user interface portion 2500 presents a part of the hierarchical data 2506 to a user by means of the output portion, and receives from a user an instruction to implement analysis processing by means of the input portion. The user interface portion 2500 also presents a result of implementation of attribute addition processing, extraction processing, and aggregate processing.

The display data 2501 is data accumulated to be presented by the user interface portion 2500, and is obtained by processing a part of the hierarchical data 2506 for presentation. More specifically, the display-data generating portion 2502 generates the display data 2501 by acquiring a part of the hierarchical data 2506 from the data managing portion 2505 and converting the acquired data into a format for presentation. Since the hierarchical data 2506 is massive, it is impossible to present the entirety thereof on a display of the user interface portion 2500. Hence, the display-data generating portion 2502 converts into the format for presentation only a volume of hierarchical data 2506 capable of presenting on the user interface portion 2500, or about such a volume of hierarchical data 2506.

The analyzing portion 2504 receives from the user interface portion 2500 the analysis processing instruction and acquires the display data 2501 or data from the data managing portion 2505, and implements analysis processing including attribute addition processing, extraction processing, and aggregate processing, of which detailed description will be provided later by referring to FIGS. 35, 38, and 41.

When analysis processing is implemented, a test implementation is first performed on the display data 2501, and then an actual implementation is performed on the hierarchical data 2506. That is, the display data 2501 which is a small volume of data is analyzed as a test beforehand, in order to verify that the analysis processing instruction inputted by the user does not contain an error.

The data managing portion 2505 functions as an interface for the hierarchical data 2506, that is, the data managing portion 2505 operates to store and retrieve data to and from the hierarchical data 2506.

Figure 29:
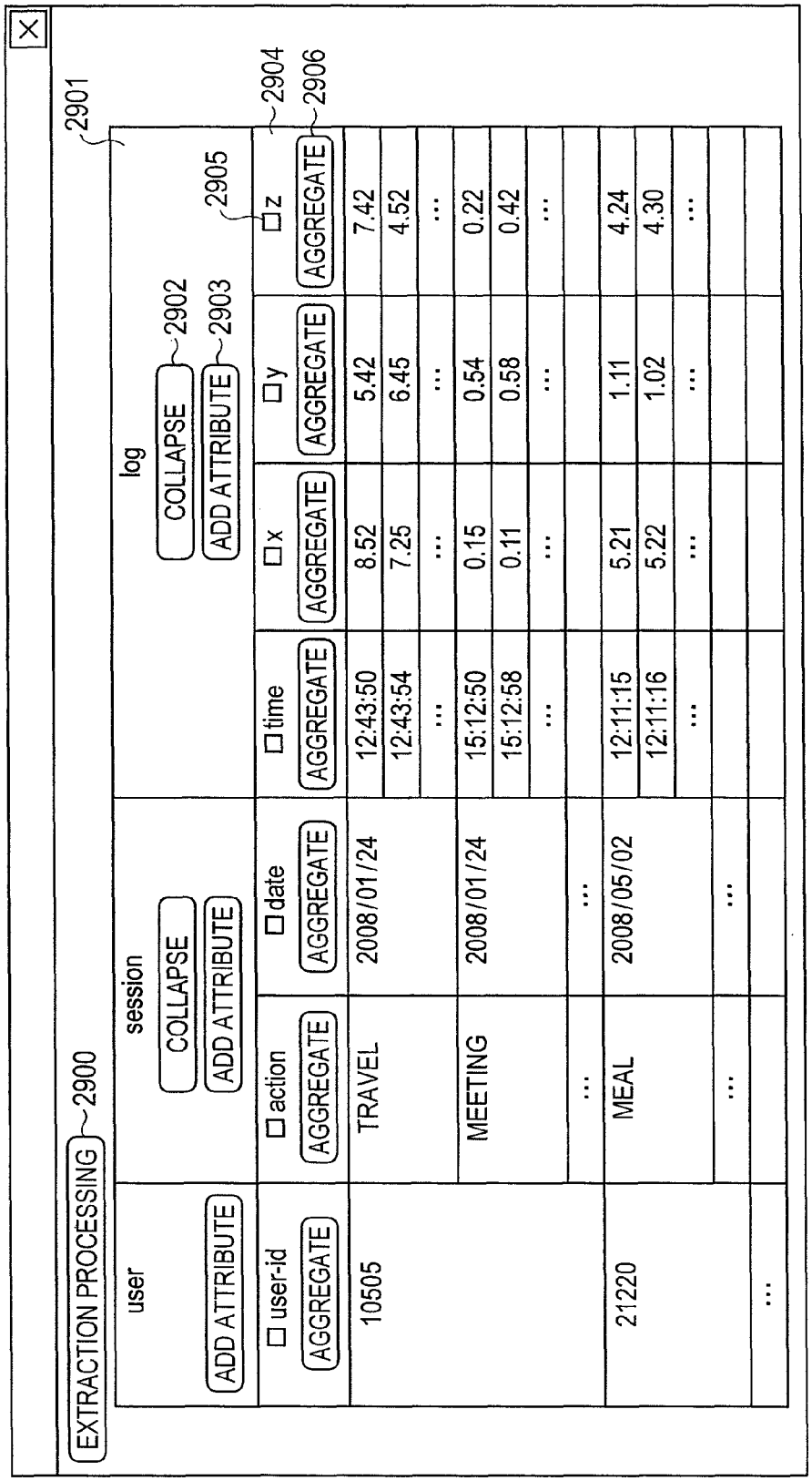
FIG. 29 shows one example of a window on a screen of a user interface portion in the first embodiment.

FIG. 29 is a view of a window presented on a screen of the display as the output portion of the user interface portion 2500 shown in FIG. 25. In the window of FIG. 29, a table presenting the user the hierarchical data 2506 is displayed. Reference numeral 2901 denotes a level-name row in the table, where the names of respective levels of the hierarchical data 2506 (hereinafter referred to as "level names") are presented. In the example of FIG. 29, the "user" level, the "session" level, and the "log" level are presented in the level-name row 2901. Reference numeral 2904 denotes an attribute-name row, where the names of attributes, which may be referred to as attribute names hereinafter, are presented. In the example of FIG. 29, the "user-id" attribute is present at the "user" level, the "action" and "date" attributes are present at the "session" level, and the "time", "x", "y", and "z" attributes are present at the "log" level.

Reference numeral 2900 denotes an extraction button that is pushed or operated when a window for extraction processing is to be presented. The extraction button 2900 constitutes one form of an aggregate button. Reference numeral 2903 denotes an attribute addition button that is operated when a window for attribute addition processing is to be presented. Reference numeral 2906 denotes a button that is operated when a window for aggregate processing is to be presented. Reference numeral 2902 denotes a collapse button that is operated when a table for presenting data is to be collapsed or expanded. Reference numeral 2905 denotes a checkbox 2905 that is ticked to select an attribute as an object of extraction when extraction processing is to be implemented.

According to the data processing device of this embodiment, a large volume data having a hierarchical structure shown in FIGS. 4 and 5 is presented to the user in the form of the table shown in FIG. 29 only partially, that is, merely by an amount possible to present on the screen of the display portion. Therefore, the user viewing the screen can easily grasp the structure, meaning, and format of the large volume hierarchical data.

Figure 30:
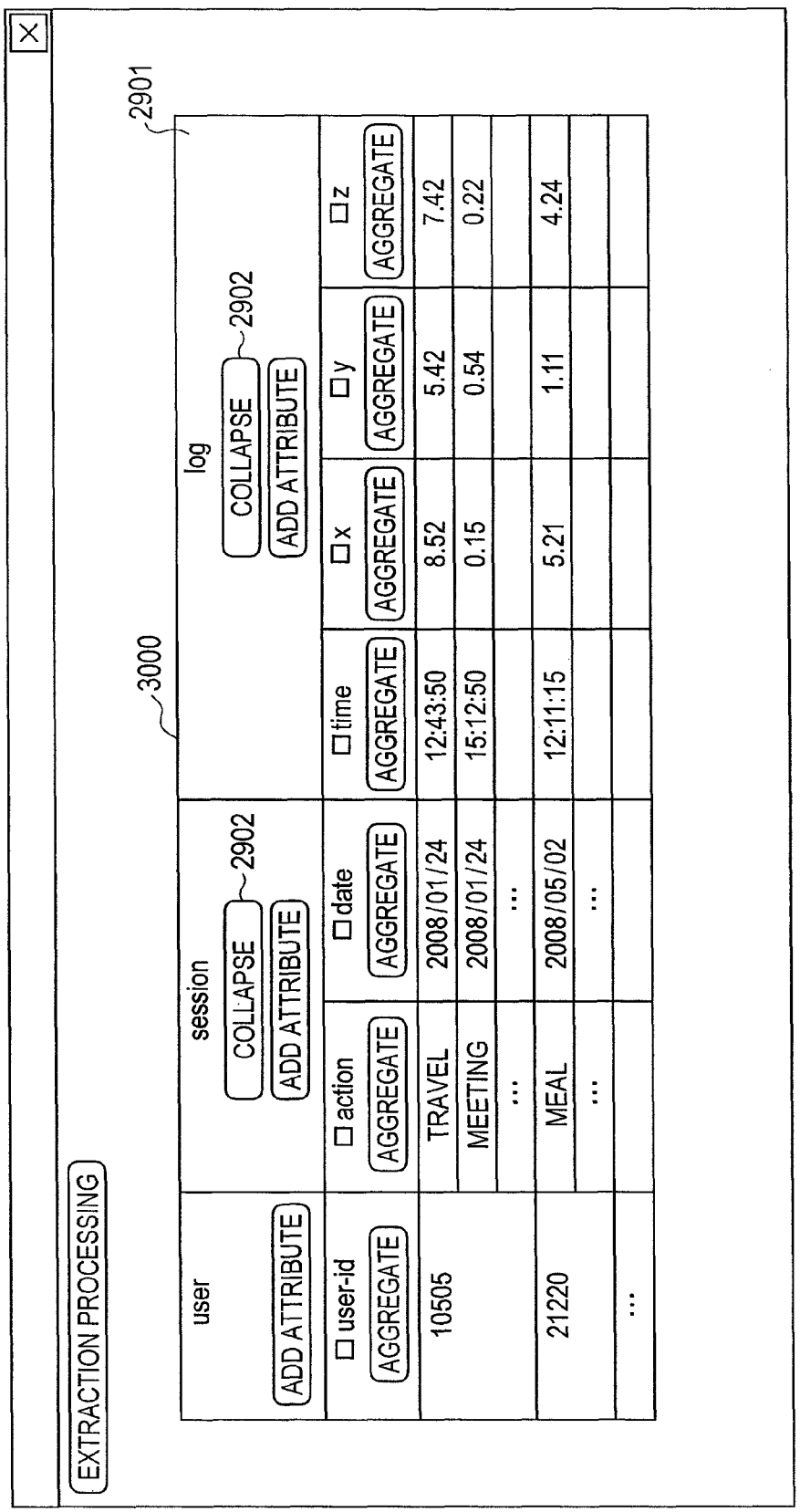
FIG. 30 shows one example of the window in a state where data is collapsed at a "log" level.

FIG. 30 is a view of the window on the screen where the table of FIG. 29 is collapsed at the "log" level. That is, by the user operating the collapse button 2902 in the cell with the word "log" in the state shown in FIG. 29, the table is collapsed to display only a single row of data for each session, as denoted by reference numeral 3000.

Figure 31:
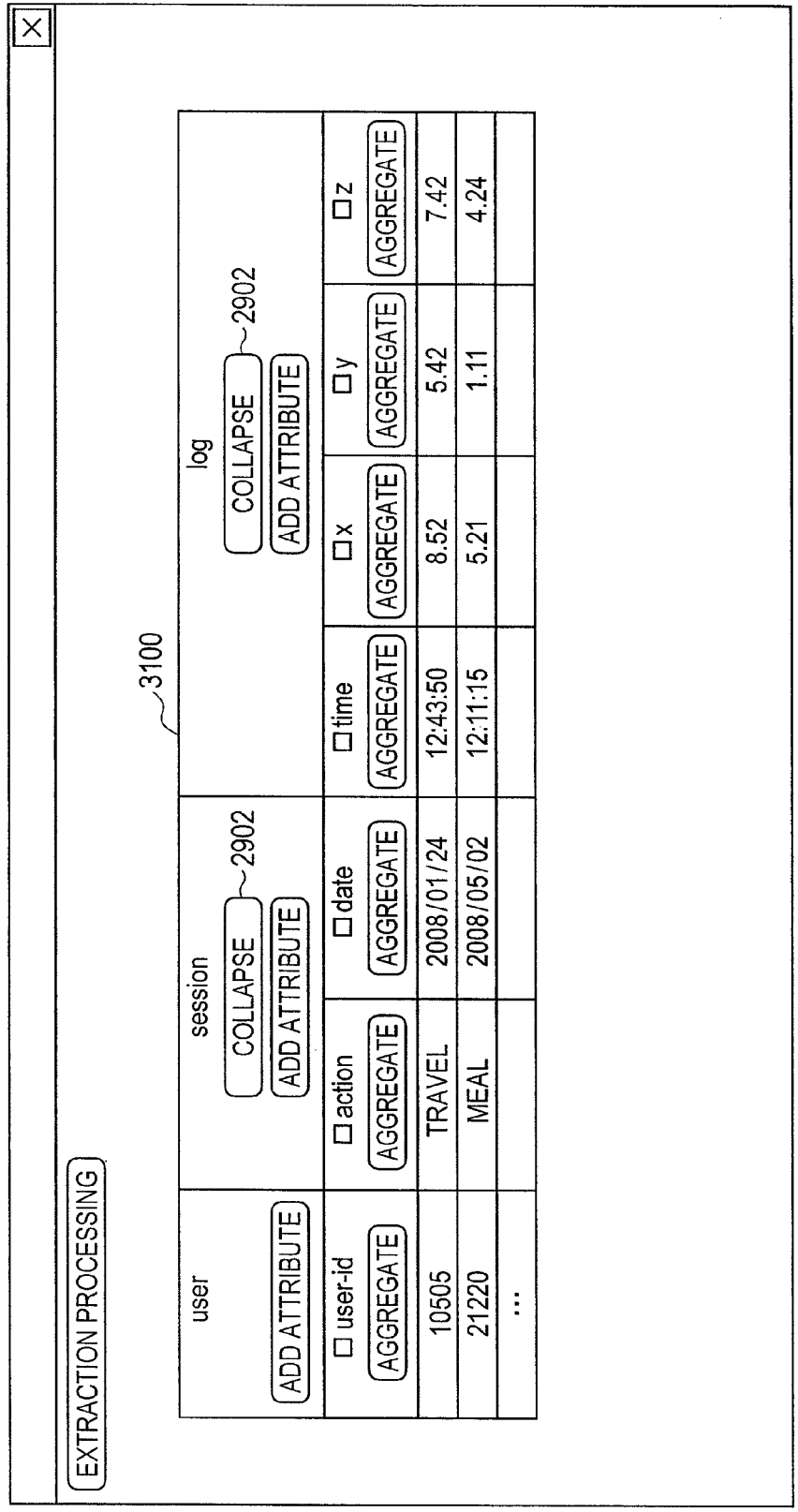
FIG. 31 shows one example of the window in a state where the data is collapsed at a "session" level.

FIG. 31 is a view of the window on the screen where the table of FIG. 29 is collapsed at the "session" level. That is, by the user operating the collapse button 2902 in the cell with the word "session", the table is collapsed to display only a single row of data for each user, as denoted by reference numeral 3100.

Figures 32, 33:
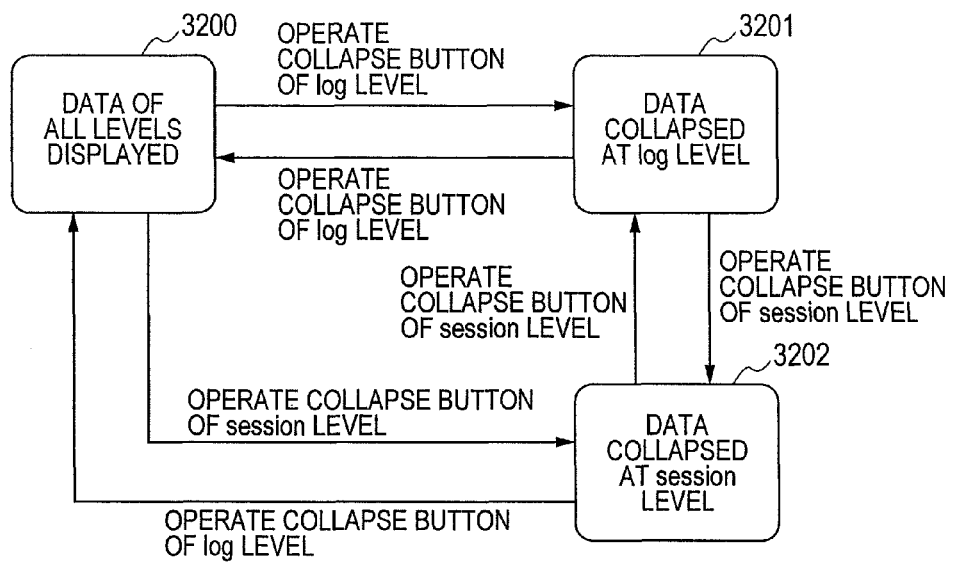
FIG. 32 is a state transition diagram illustrating how a table display changes with collapse and expansion at respective levels in the first embodiment.
FIG. 33 shows one example of a window for attribute addition processing that is presented, for instance, when an attribute addition implement button is operated, in the first embodiment.

FIG. 32 is a state transition diagram illustrating how the table display changes with collapse and expansion at respective levels. In FIG. 32 are shown three table states, namely, a first state 3200, a second state 3201, and a third state 3202, in which the table is placeable. The first state 3200 displays data of all the levels and corresponds to the table state shown in FIG. 29. The second state 3201 is a state where the table is collapsed at the "log" level, and corresponds to the table state of FIG. 30. The third state 3202 is a state where the table is collapsed at the "session" level, and corresponds to the table state of FIG. 31. Operating the collapse button 2902, 2902 (shown in FIGS. 30 and 31) switches the table state among the three states as illustrated in FIG. 32. More specifically, operating the collapse button 2902 of the "log" level while the table is in the first state 3200 places the table in the second state 3201. Operating the collapse button 2902 of the "session" level while the table is in the first state 3200 places the table in the third state 3202. Operating the collapse button 2902 of the "log" level while the table is in the second state 3201 places the table in the first state 3200. Operating the collapse button 2902 of the "session" level while the table is in the second state 3201 places the table in the third state 3202. Operating the collapse button 2902 of the "log" level while the table is in the third state 3202 places the table in the first state 3200. Operating the collapse button of the "session" level while the table is in the third state 3202 switches the table in the second state 3201. When a collapse of the data is implemented at any level, all the rows as the object of the collapse are collapsed at a time, meaning that rows intended to be hidden or made disappear as a result of the collapse are made disappear simultaneously. When an expansion of the data is implemented at any level, all the rows as the object of the expansion are expanded at a time, meaning that rows intended to be made appear as a result of the expansion are made appear simultaneously.

The arrangement allowing a user to collapse data at any level as desired enables a user to intuitively comprehend the structure of the data. Further, since this arrangement enables a user to collapse data at a level of no interest, it is facilitated to easily focus the user's attention on data at a specific level of interest.

Referring to FIGS. 33 to 43, there will be described in detail the attribute addition processing, extraction processing, and aggregate processing.

Figure 35:
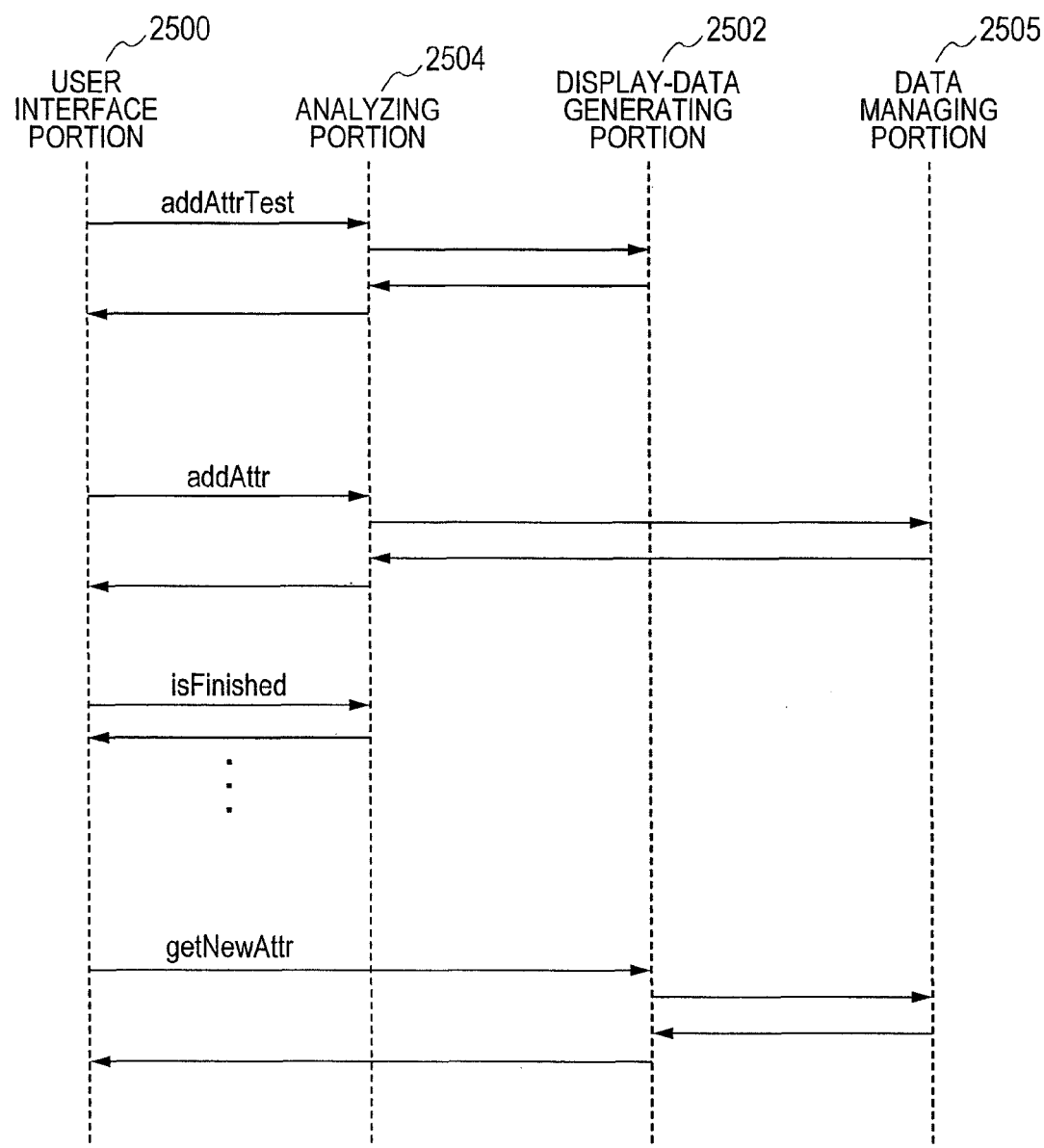
FIG. 35 is a sequence diagram of the attribute addition processing.

There will be first described the attribute addition processing, referring to FIGS. 33 to 35.

FIG. 33 is a view of the window for attribute addition processing, which may be presented by operating the attribute addition button 2903 shown in FIG. 29. Reference numeral 3300 denotes a new attribute name entry field in which the name of an attribute to be added is inputted. Reference numeral 3301 denotes a target level entry field in which the name of the level at which the newly added attribute is to be present. Reference numeral 3302 denotes a program entry field in which a function or a program for calculating the value of the newly added attribute is inputted. Operating an attribute addition implement button 3303 activates the attribute addition processing.

FIG. 34 is a view of the window on the screen of the user interface portion 2500 at a timing of termination of the test implementation of the attribute addition processing. Reference numeral 3400 denotes a data column of the newly added attribute "period".

FIG. 35 is a sequence diagram of the attribute addition processing. First, in the window shown in FIG. 33 on the screen of the user interface portion 2500, an instruction or a command requesting the attribute addition processing is inputted in the program entry field 3302, and the attribute addition implement button 3303 is operated to implement the test implementation of the attribute addition processing. In response to this command, the display data 2501 and an analysis command, i.e., "addAttrTest" in FIG. 35, are passed to the analyzing portion 2504, which then passes the value of the newly added attribute to the display-data generating portion 2502. The display-data generating portion converts the received attribute value into the display data 2501, which is presented on the display of the user interface portion 2500. Thus, when the test implementation is done, a result thereof is immediately presented on the user interface portion 2500. In this way, the user can view a result of implementation of the attribute addition processing without waiting for completion of the processing on the entirety of the large volume data. Through the test implementation, the user can also verify whether the command is correctly described to realize the intended processing.

After the completion of the test implementation, the attribute addition implement button 3303 is again operated to perform an actual implementation of the attribute addition processing. In response to this, an analysis command, i.e., "addAttr" in FIG. 35, is passed to the analyzing portion 2504, which then acquires data from the data managing portion 2505 and initiates processing thereof. Since the data is of large volume this time, it takes a longer time to complete the processing. Hence, the user interface portion 2500 periodically sends the analyzing portion 2504 a query command, i.e., "isFinished" in FIG. 35, asking whether the processing is completed. After the completion of the processing, the user interface portion 2500 issues to the display-data generating portion 2502 a request to present data of the newly added attribute, i.e., "getNewAttr". The display-data generating portion 2502 receiving the request "getNewAttr" acquires necessary data from the data managing portion 2505 and converts the data into the display data 2501 which is presented on the user interface portion 2500.

Figure 36:
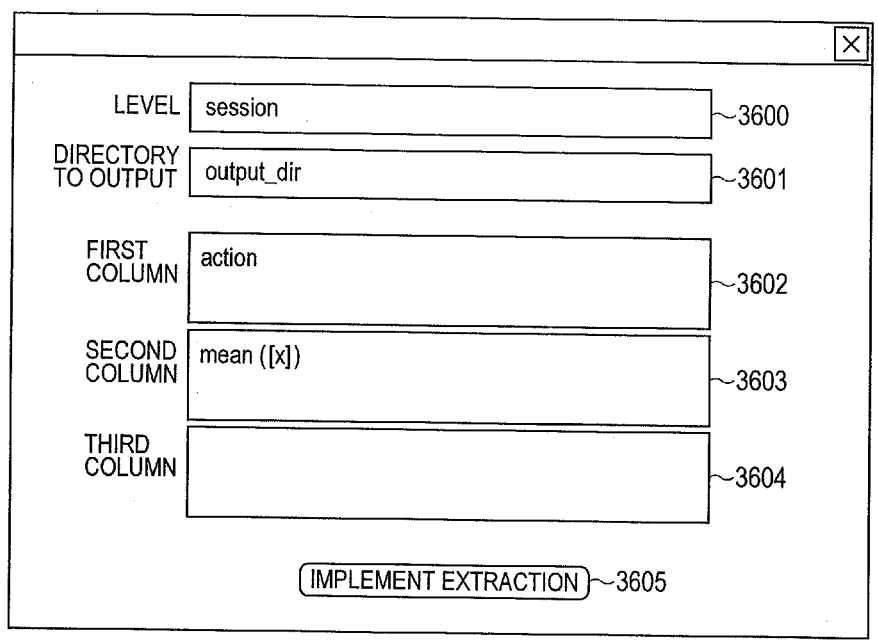
FIG. 36 shows one example of a window for extraction processing that is presented, for instance, when an extraction implement button is operated, in the first embodiment.

FIG. 36 is a view of the window for extraction processing, which may be presented when the extraction button 2900 is operated after the checkbox 2905 is ticked in the window of FIG. 29. Reference numeral 3600 denotes a level entry field in which the name of a level with respect to which extraction processing is to be implemented is inputted. Reference numeral 3601 denotes an output directory entry field in which the name of a directory to which a result of the extraction processing is to be outputted is inputted. Reference numeral 3602 denotes a first-column program entry field in which a function or program for calculating data to be presented in a first column of data outputted as the result of the extraction processing is inputted. Reference numerals 3603, 3604 are a second-column program entry field and a third-column program entry field in which functions or programs for calculating data to be presented in second and third columns of the data outputted, respectively. Operating an extraction implement button 3605 activates the extraction processing.

Figure 37:
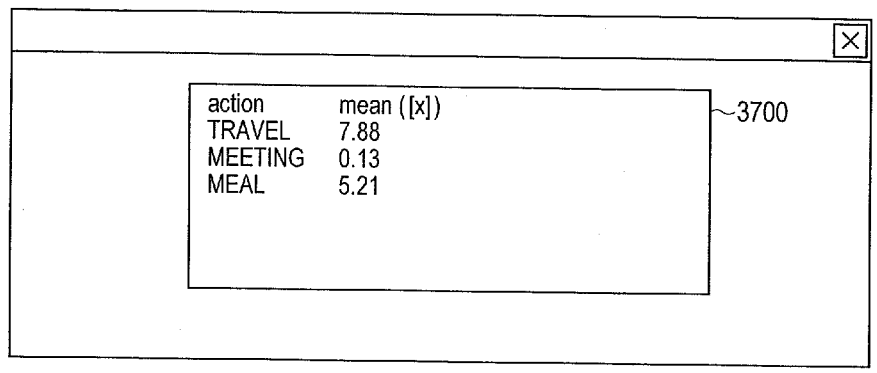
FIG. 37 shows one example of a window presented when a test implementation of extraction processing is completed in the first embodiment.

FIG. 37 is a view of a window 3700 presented on the display when a test implementation of the extraction processing is completed. The window 3700 displays the result of the extraction processing.

Figure 38:
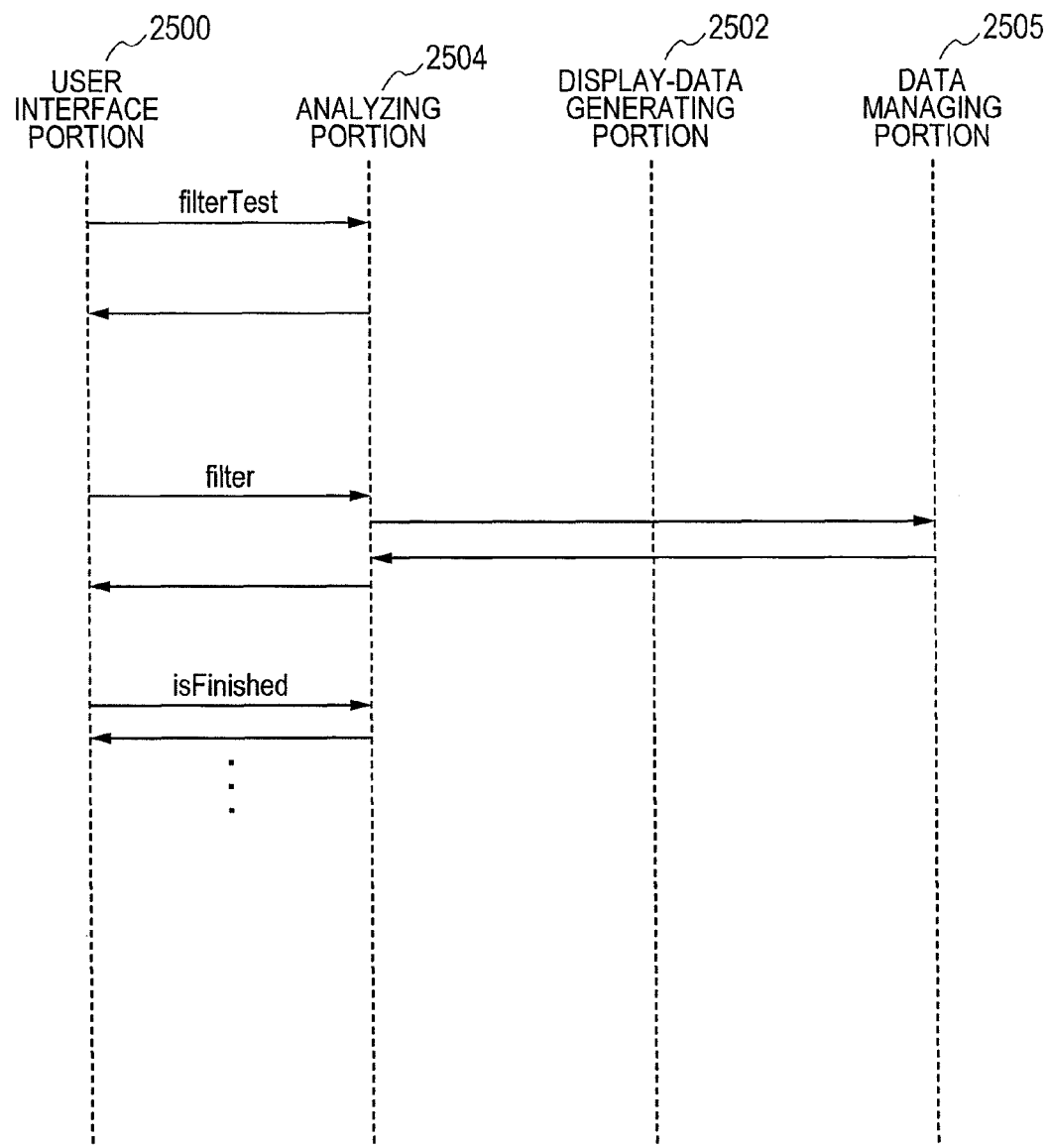
FIG. 38 is a sequence diagram of the extraction processing.

FIG. 38 is a sequence diagram of the extraction processing. First, in the window shown in FIG. 36 on the screen of the user interface portion 2500, an instruction or a command requesting the extraction processing is inputted, and the extraction implement button 3605 is operated to implement the test implementation of the extraction processing. In response to this command, the display data 2501 and an analysis command, i.e., "filterTest" in FIG. 38, are passed to the analyzing portion 2504, which then implements the processing and presents the result thereof in the window shown in FIG. 37. Thus, when the test implementation is completed, the result is immediately presented on the user interface portion 2500. In this way, the user can view a result of implementation of the extraction processing without waiting for completion of the processing on the entirety of the large volume data. Through the test implementation, the user can also verify whether the command is correctly described to realize the intended processing.

After the completion of the test implementation of the extraction processing, the extraction implement button 3605 is again operated to perform an actual implementation of the extraction processing. In response to this, an analysis command, i.e., "filter" in FIG. 38, is passed to the analyzing portion 2504, which then acquires data from the data managing portion 2505 and initiates processing thereof. Since the data is of large volume this time, it takes a longer time to complete the processing. Hence, the user interface portion 2500 periodically sends the analyzing portion 2504 a query command, i.e., "isFinished" in FIG. 38, asking whether the processing is completed. After the completion of the processing, the user interface portion 2500 presents a message or others on the screen to notify the user of the processing completion. The extracted data as the result of the processing is temporarily stored as the temporary data 2503 in the directory as inputted in the output directory entry field 3601. The temporary data 2503 is used in analysis implemented by other programs or others.

Figure 39:
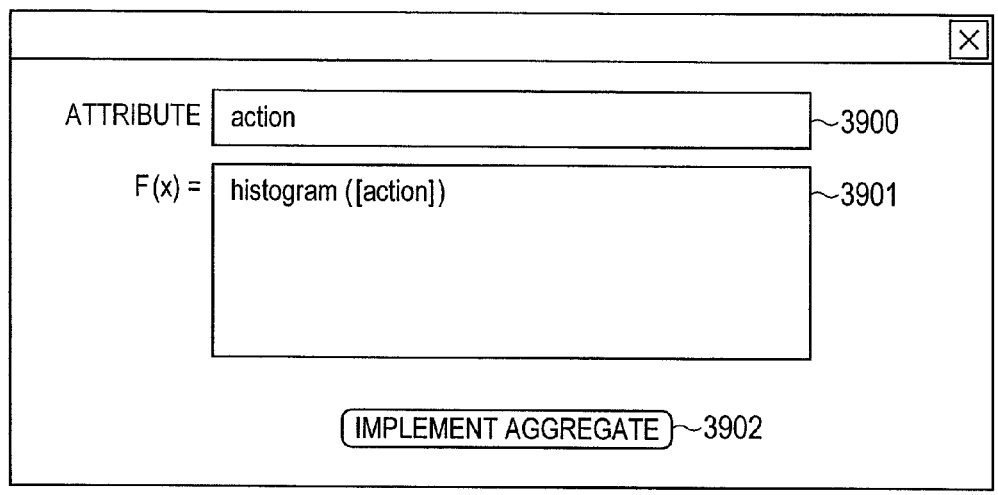
FIG. 39 shows one example of a window for aggregate processing that is presented, for instance, when an aggregate implement button is operated, in the first embodiment.

FIG. 39 is a view of the window for aggregate processing, which may be presented when an aggregate implement button 2906 is operated in the window of FIG. 29. Reference numeral 3900 denotes an attribute entry field in which the name of an attribute on which the aggregate processing is to be performed is inputted. Reference numeral 3901 is a program entry field in which a function or a program of the aggregate processing is inputted. Operating the aggregate implement button 3902 activates the aggregate processing.

Figure 40:
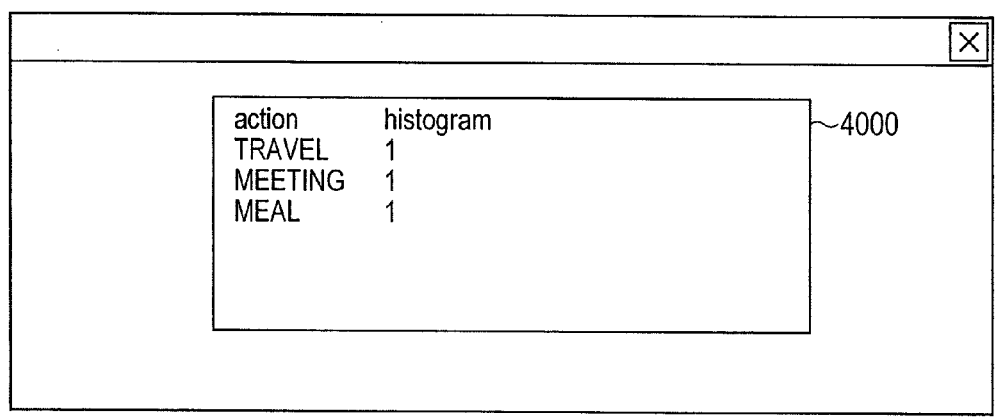
FIG. 40 shows one example of a window presented when a test implementation or an actual implementation of an aggregate processing is completed.

FIG. 40 is a view of a window 4000 presented when both a test implementation and an actual implementation of the aggregate processing are completed. The window 4000 displays the result of the aggregate processing.

Figure 41:
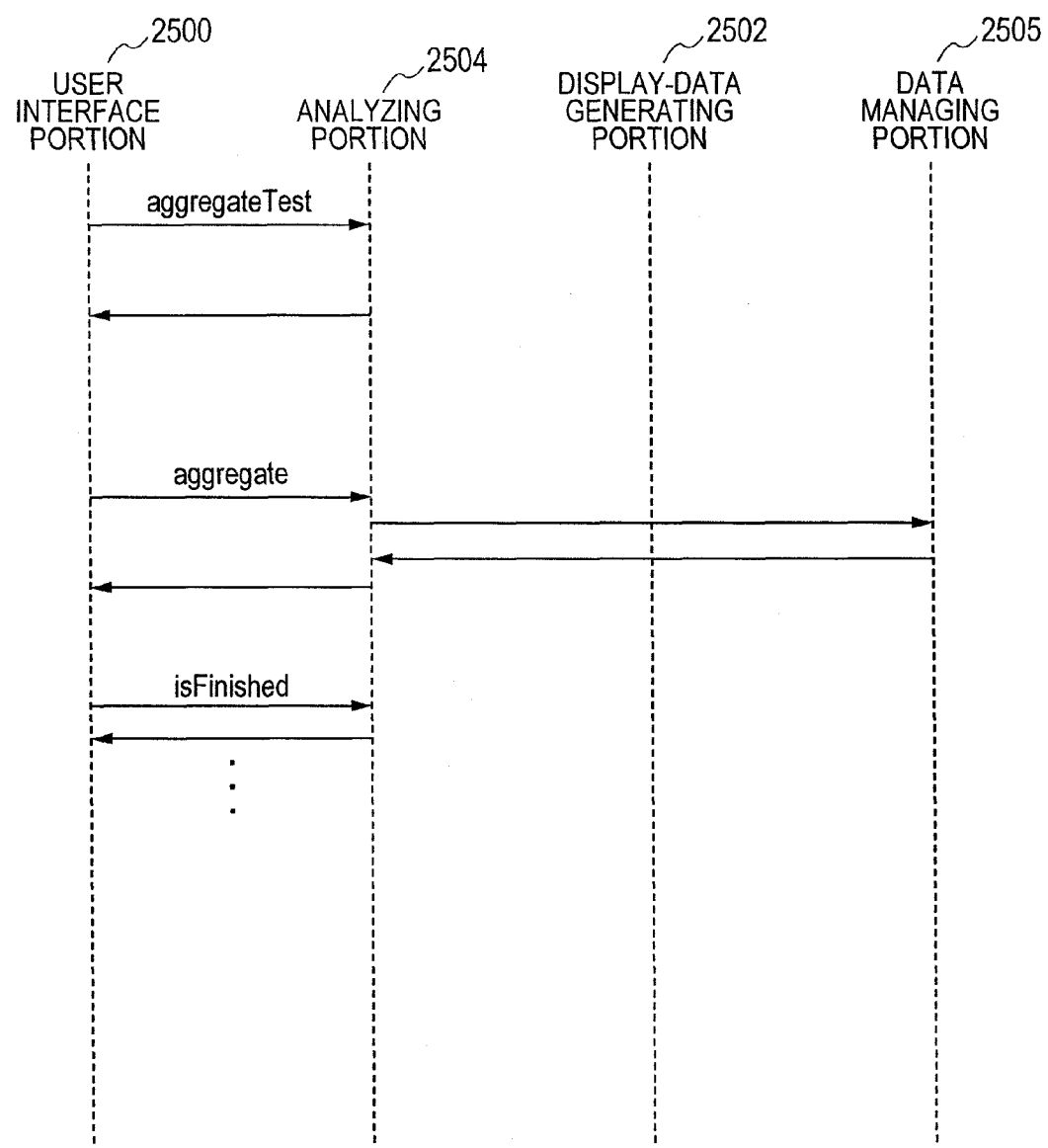
FIG. 41 is a sequence diagram of the aggregate processing.

FIG. 41 is a sequence diagram of the aggregate processing. First, in the window shown in FIG. 39 on the screen of the user interface portion 2500, an instruction or a command requesting the aggregate processing is inputted, and the aggregate implement button 3902 is operated to implement the test implementation of the aggregate processing. In response to this command, the display data 2501 and an analysis command, i.e., "aggregateTest" in FIG. 41, are passed to the analyzing portion 2504, which then implements the processing and presents the result thereof in the window 4000 shown in FIG. 40. Thus, when the test implementation is completed, the result is immediately presented on the user interface portion 2500, and the user can verify whether the command is correctly described to realize the intended processing.

After the completion of the test implementation of the aggregate processing, the aggregate implement button 3902 is again operated to perform an actual implementation of the aggregate processing. In response to this, an analysis command, i.e., "aggregate" in FIG. 41, is passed to the analyzing portion 2504, which then acquires data from the data managing portion 2505 and initiates processing thereof. Since the data is of large volume this time, it takes a longer time to complete the processing. Hence, the user interface portion 2500 periodically sends the analyzing portion 2504 a query command, i.e., "isFinished" in FIG. 41, asking whether the processing is completed. After the completion of the processing, the user interface portion 2500 presents the result of the processing on the screen in FIG. 40.

Figure 42:
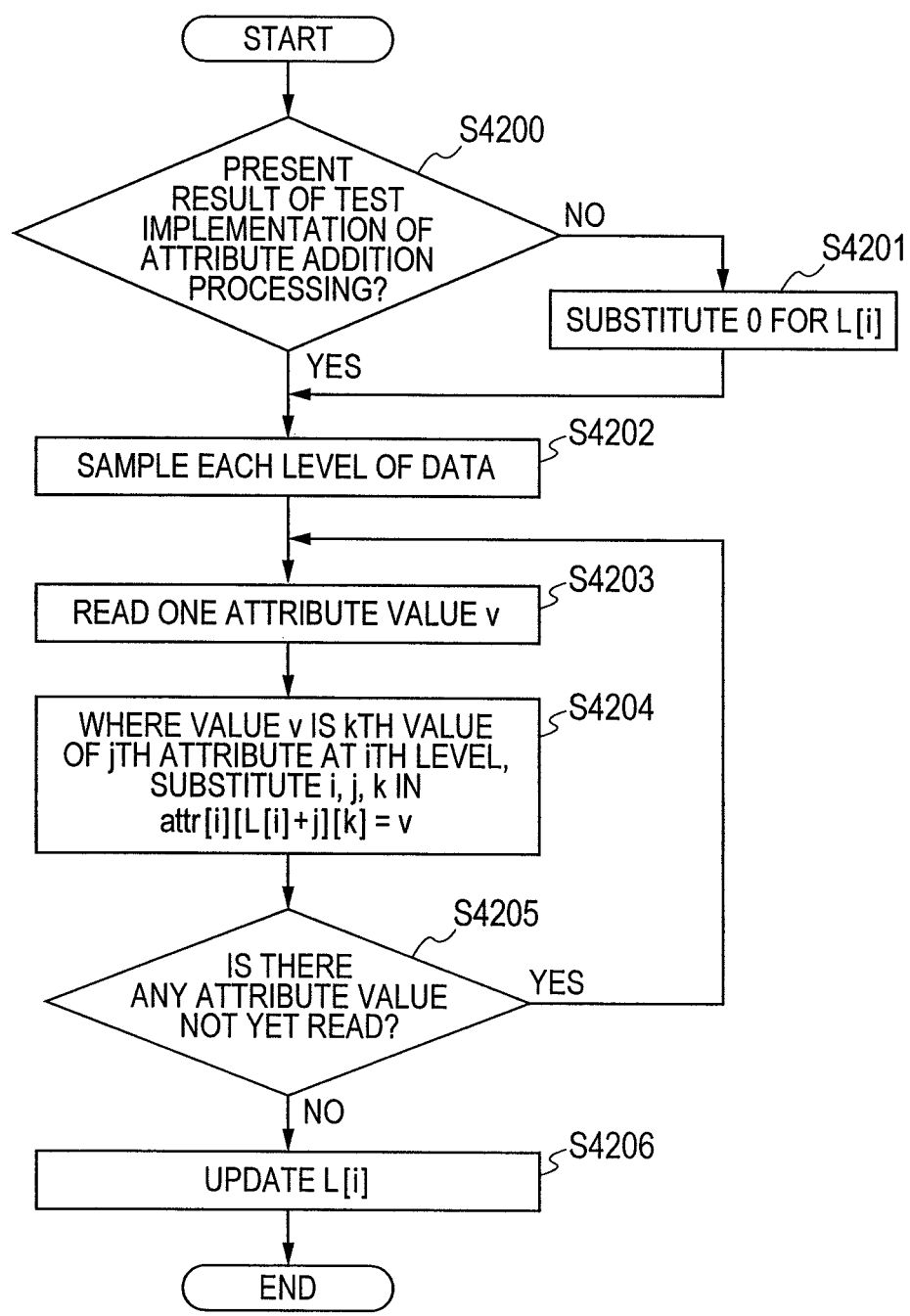
FIG. 42 is a flowchart of operation of a display-data generating portion of the apparatus of the first embodiment.

FIG. 42 is a flowchart illustrating operation of the display-data generating portion 2502, which operates in two cases, namely, when a window is presented on the screen upon activation of the user interface portion 2500, and when a newly added attribute is presented in a window on the screen at the time of a test implementation or an actual implementation of attribute addition processing. The flow begins with step S4200 in which it is determined whether it is the case to present a result of attribute addition processing. When it is not the case to present a result of a test implementation of attribute addition processing, a negative decision (NO) is made in step S4200 and the flow goes to step S4201 to initialize, or set to zero, all the values of L[i], and then goes to step S4202. L[i] represents the number of attributes present at an "i"th level of data being displayed in the window on the screen. In the specific example of FIG. 29, when the window shown in FIG. 29 is presented, L[0] represents the number of attributes at the "user" level and is 1, and L[1] and L[2] represent the numbers of attributes at the "session" and "log" levels and are 2 and 4, respectively.

On the other hand, when it is determined in step S4200 that it is the case to present a result of a test implementation of attribute addition processing, the flow goes to step S4202, skipping step S4201.

In step S4202, the data is sampled with respect to its each level. Since the hierarchical data is voluminous, it is impossible to present the entirety thereof in the window on the screen. Hence, the data is sampled to extract a part thereof to be presented on the screen. For instance, the number of data to be presented on the screen is predetermined for each level, and the predetermined number of data are extracted from the top at each level. In the specific example of FIG. 29, the predetermined number is two for all the levels, i.e., the "user", "session", and "log" levels.

In FIG. 43, reference numeral 4300 denotes one example of the window on the screen after the sampling where the predetermined number of data to be extracted is two for all the levels "user", "session", and "log". That is, the window 4300 presents one example of the data as has been subjected to the sampling.

In the following step S4203, a single value v of an attribute is read from the data having been subjected to the sampling. Assume that the read value is a value appearing in the "k"th place in an attribute in the "j"th place at an "i"th level. The values of i, j, k can be obtained, for instance, by counting the number of brackets in the data shown in FIG. 43 that is the data having been subjected to the sampling. For instance, consider an attribute value "meeting". The attribute "action" appears first at the second level, and thus i=2, j=1. Further, the attribute value "meeting" appears in the second place in the attribute "action", and thus k=2. In step S4204, the obtained values of i, j, k are substituted into the following expression: attr[i][L[i]+j][k]=v. When the test implementation of the attribute addition processing has been performed, the processing to generate display data needs to be implemented with respect to only the newly added attribute, by use of the value L[i]. That is, the use of the value L[i] makes it unnecessary to again implement the processing to generate display data with respect to all the attributes. Thus, the result of the attribute addition processing can be presented quickly.

As described later with respect to a second embodiment of the invention, when using data that is divided into a plurality of data subsets corresponding to the respective attributes and contained in files in such units, it is possible to input such files and process the files to generate therefrom display data shown in FIG. 42, without restoring the hierarchical structure of the data. According to this arrangement where the data is divided by attribute into files and managed file by file, processing to restore the hierarchical structure is not involved, thereby enabling to generate display data quickly. That is, by storing, in the memory portion, data of the respective attributes in the form of files corresponding to the attribute names, display data can be generated quickly. Further, when data of a list corresponding to an attribute name is to be aggregated, the aggregate calculation can be quickly completed by using a data file corresponding to the attribute name.

In step S4205 of the flowchart of FIG. 42, it is determined whether there is any attribute value not yet read. When it is determined in step S4205 that there is an attribute value not yet read, the flow returns to step S4203. Otherwise the flow goes to step S4206.

In the last step S4206, the value of L[i] is updated. For instance, when the window of FIG. 29 is presented, the updating is such that L[0]=1, L[1]=2, L[2]=4.

The analyzing portion 2504 can be realized in a way similar to a processing system of a common programming language. The data managing portion 2505 will be described later with respect to a second embodiment of the invention.

Second Embodiment

There will be described a data processing device according to a second embodiment of the invention, which implements at high speed and in a single computer data analysis processing on data having the hierarchical structure as described above.

The data processing device of the second embodiment includes a first unit for preprocessing raw data to convert into a format manageable in the computer, and a second unit for implementing a data analysis based on a received script or source code for the data analysis. The first unit for preprocessing raw data to convert into a format manageable in the computer will be described later, by referring to FIG. 1. The second unit for implementing a data analysis based on a received script or source code for the data analysis will be described later, by referring to FIG. 2.

Figure 2:
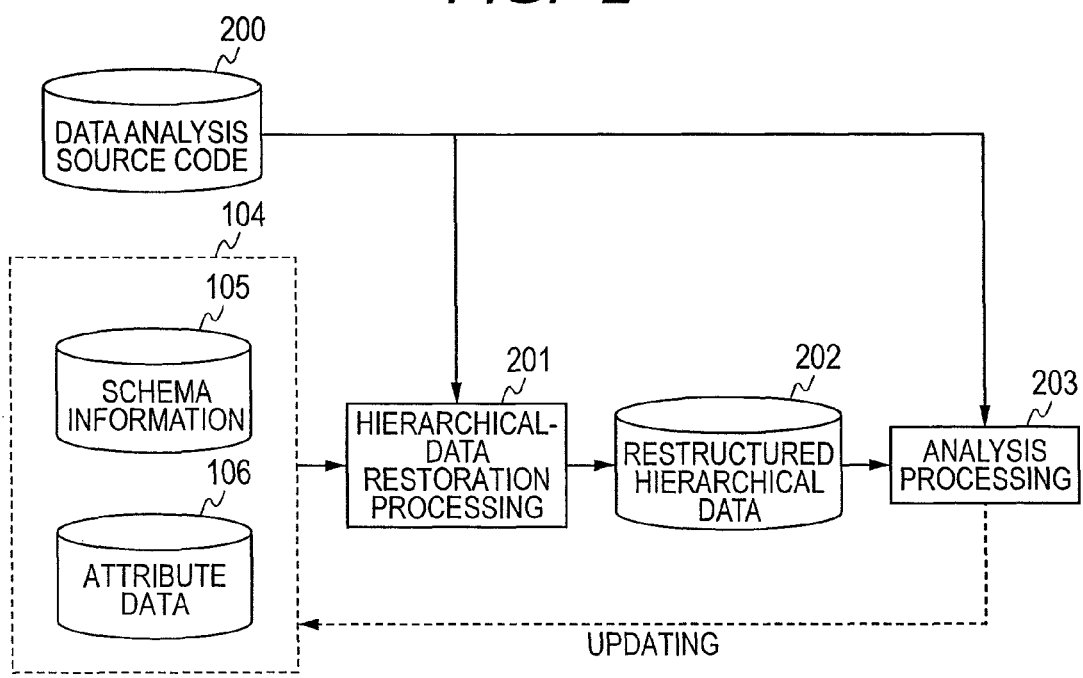
FIG. 2 is a block diagram of a second unit of the data processing device, which receives a source code of a data analysis processing and implements the data analysis processing.

FIG. 1 is a functional block diagram of the first unit in the form of a computer, and FIG. 2 is a block diagram of the second unit in the form of a computer. The first and second units may or may not be provided by a same, single computer. In FIG. 1, reference numerals 101 and 103 denote hierarchization processing and data division processing, respectively, that are implemented according to programs by the CPU 2403 (shown in FIG. 24) as a processing portion. Processing in FIG. 2 and the following drawings is also implemented according to programs by the CPU 2403.

In FIG. 1, reference numerals 100, 102, 105, and 106 denote raw data, hierarchical data, schema information, and attribute data, respectively, that are accumulated and stored in a memory portion such as the main memory portion 2404 and the auxiliary memory portion 2405 shown in FIG. 24. That is, the processing portion (the CPU 2403) implements, on raw data 100 that the processing portion has received, hierarchization processing 101 and outputs hierarchical data 102 and schema information 105. Then, the processing portion implements data division processing 103 based on the hierarchical data 102 and the schema information 105 and outputs attribute data 106.

In the second embodiment, the preprocessing shown in FIG. 1 is performed on the raw data 100 only once, and the data as an object of analysis is managed in the computer in the form of a combination 104 of the schema information 105 and the attribute data 106. It is noted that when the hierarchical data 102 and the schema information 105 are received as input, only the data division processing 103 may be implemented, i.e., the hierarchization processing 101 may be omitted.

In the description below, data shown in FIG. 3 will be illustrated as one example of the raw data 100 to be subjected to the processing of FIG. 26. However, it is to be understood that the second embodiment is applicable to data other than that shown in FIG. 3. The raw data 100 shown in FIG. 3 represents a log of an acceleration sensor attached on a user's body. The log records the values of "user-id", "action", "date", "time", "acceleration in an x-axis direction", "acceleration in a y-axis direction", and "acceleration in a z-axis direction" as shown at the top row of the raw data 100. Although in FIG. 3 data for only one user is shown, actually there are data for a plurality of users.

The hierarchization processing 101 shown in FIG. 1 converts the raw data 100 in the form of a table as shown in FIG. 3 into a hierarchical data format. As one example of data having a hierarchical structure, there is known XML data as described above. FIG. 4 shows data 400 of XML format as obtained by converting the raw data 100 of FIG. 3 by subjecting the data 100 to grouping with the items "user-id", "action", and "date" being keys.

To generate the XML data 400 shown in FIG. 4 from the data shown in FIG. 3, data of rows of a same user ID are initially grouped. Then, within each of the thus obtained groups, data of rows having a same value in both the "action" and "date" tags are grouped, respectively. The contents or details of the hierarchization processing 101 are determined to meet the purpose of the data analysis by an operator or an implementer who implements the data analysis processing of the present embodiment. For instance, the operator or implementer determines the names of tags of XML and an attribute that is to be used as the key in the grouping process.

Referring to FIG. 5, reference numeral 500 denotes data obtained by replacing XML tags in the data 400 shown in FIG. 4 with round and square brackets. More specifically, a set of data where data of different types is enclosed in a pair of round brackets, and a set of data where data of a same type repeat is enclosed in a pair of square brackets. Hereinafter, the former and latter data sets may be referred to as a tuple and a list, respectively. In the present embodiment, data is hierarchically or recursively expressed with lists and tuples. In the specific example of FIG. 5, the hierarchical structure expressed with lists and tuples are represented using round and square brackets. However, the hierarchical structure expressed with lists and tuples can be represented in various other ways including use of XML.

The structure of a part of the data 500 (shown in FIG. 5) that corresponds to data for one user is schematically shown in FIG. 6, and is denoted by reference numeral 600. In FIG. 6, reference letters T and L represent a tuple and a list, respectively. The name of each node or square block corresponds to the name of a counterpart XML tag in the XML data 400 (shown in FIG. 4). In each list, data (or elements) of a same data type repeatedly appear. Hence, FIG. 6 shows only one of the elements in each list that appears first in the list, below the block of the list, with letter "T" indicative of a tuple. The other elements following the shown one in each list are not illustrated in FIG. 6.

Figure 7:
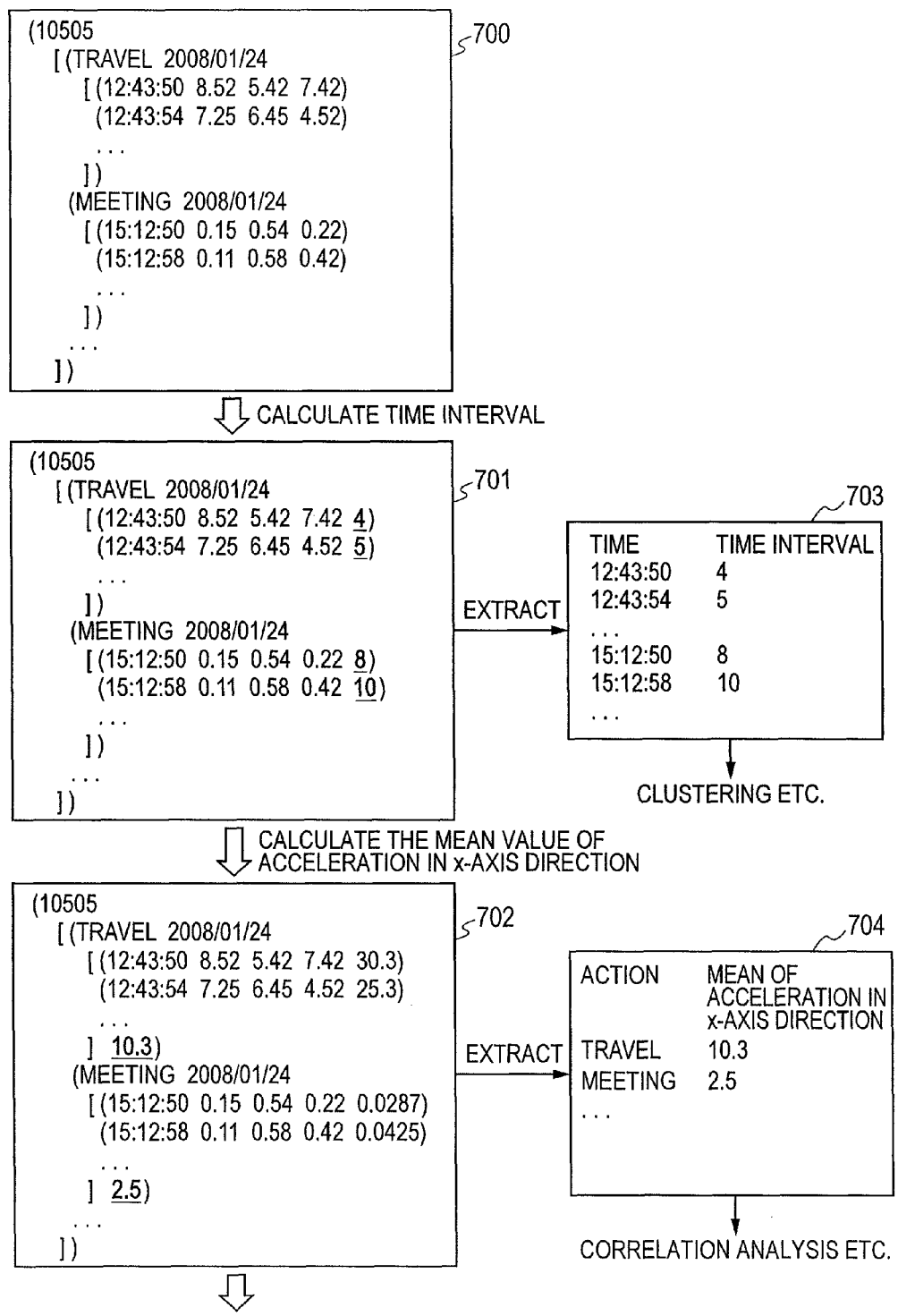
FIG. 7 shows one example of a data analysis assumed to be implemented in the second embodiment.

FIG. 7 shows one example of a data analysis assumed to be implemented by the data processing device of the second embodiment. In the specific example of FIG. 7, first to fourth analyses are implemented. In the first analysis, with respect to data 700 that is obtained as a result of implementation of the hierarchization processing 101 on the raw data, a difference in the value of time from the subsequent "log" tag is calculated for each "log" tag in the XML data 400 shown in FIG. 4 to obtain a time interval. The obtained time interval value is added to the data 700 to generate data 701 to be outputted. In the data 701 as shown in FIG. 7, the added value is underlined. In the second analysis, with respect to the data 701 including the time interval value, the values of time and time interval are extracted for the respective "log" tags in the XML data 400 of FIG. 4. Based on the extracted values, clustering is performed on the data 701 by a known method such as k-means. In the third analysis, with respect to the data 701 including the time interval value, the mean of the values of acceleration in the x-axis direction in each log tag in the XML data 400 is calculated, and the obtained mean is added to the data 701 to obtain data 702 to be outputted. In the data 702 as shown in FIG. 7, the added value is underlined. As can be seen when comparing the data 701 to the data 702 in FIG. 7, data may be added to any level as desired. In the fourth analysis, with respect to the data 702 including the mean of the values of acceleration in the x-axis direction, data of the actions and the means of the values of acceleration in the x-axis direction are extracted, and a correlation analysis is implemented thereon by a known method such as calculation of a correlation coefficient.

In the example of data analysis shown in FIG. 7, the processing is performed using values of only a small number of attributes, and the thus obtained values are added as new attribute values to a desired level or are passed to other known processing. According to the second embodiment, in a data analysis using data of only a small number of attributes, data is preprocessed to be divided by attribute value, and data of attributes are stored in respective files, thereby enabling to reduce the time taken for the processing.

Figure 8:
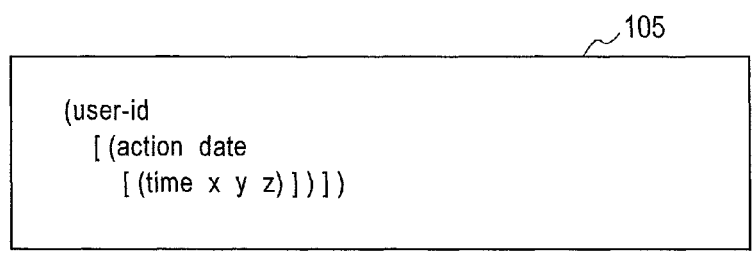
FIG. 8 shows schema information in the second embodiment.

FIG. 8 shows the schema information 105 in an instance where the data 100 shown in FIG. 3 is used as the raw data. In the schematic view of FIG. 6, the data structure is represented using brackets in order to facilitate handling of the data by a program. The schema information 105 of FIG. 8 is obtained by extracting tags from the XML data 400 of FIG. 4, and can be automatically generated by implementing hierarchization processing 101 determined or designated by the implementer of the present embodiment.

Figure 9:
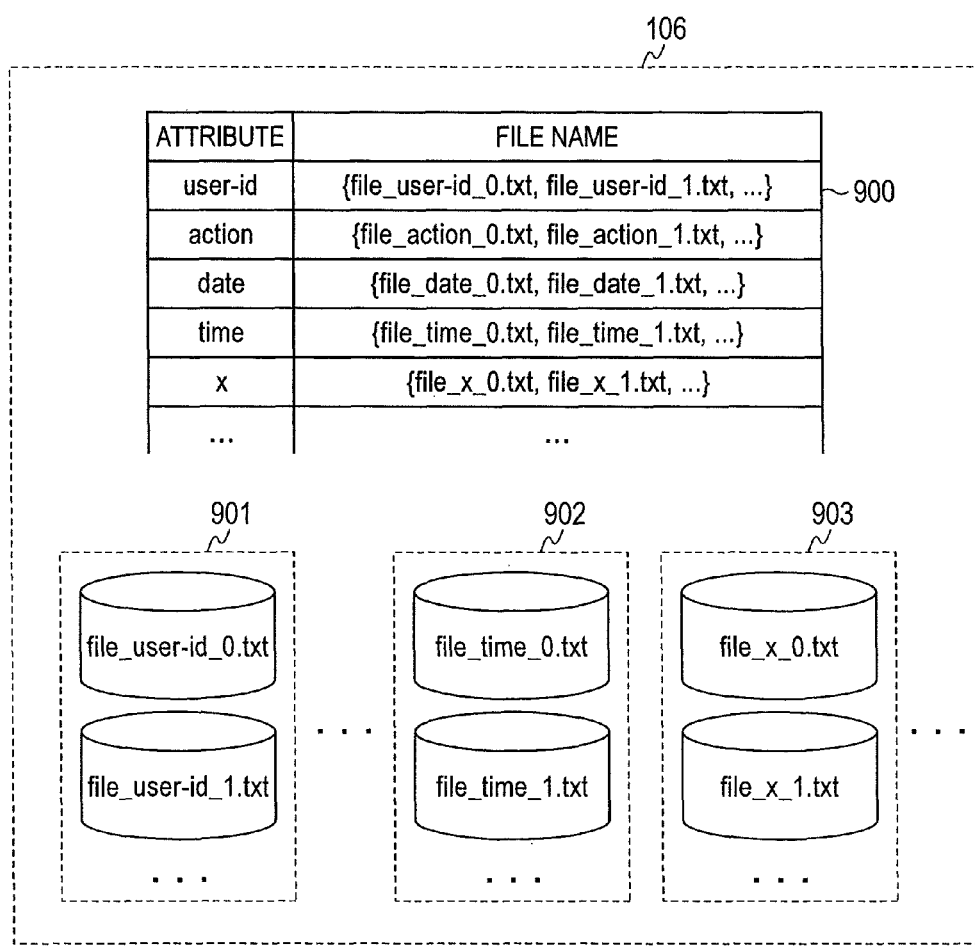
FIG. 9 shows one example of attribute data in the second embodiment.

FIG. 9 shows by way of example attribute data 106 generated by the data division processing 103 from the hierarchical data 102 and the schema information 105 in the instance where the data 100 of FIG. 3 is used as the raw data. The attribute data 106 is managed in the form of a combination of a file name management table 900 and attribute files 901, 902, 903 that contain values of respective attributes. More specifically, the attribute file 901 is a group of files containing values of the "user-id" tag in the XML data 400 of FIG. 4. The attribute file 902 is a group of files containing values of the "time" tag in the XML data 400. The attribute file 903 is a group of files containing values of the "x" tag in the XML data 400. The file name management table 900 manages what file contains what tag or attribute values in the XML data 400 of FIG. 4. In other words, the file name management table 900 manages association between the names of attributes and the names of files containing the values of the attributes. For instance, by referencing the file name management table 900, it can be seen that the values of the "time" tag in the XML data 400 are contained in files having names "file_time_0.txt, file_time_1.txt, and so on, sequentially in order.

FIG. 10 shows contents of the files containing the attribute values in the instance where the data 100 of FIG. 3 is used as the raw data. At the top of FIG. 10 is shown contents 1000 of a file named "file_user-id_0.txt" in which values of user ID are presented one at a row. At the middle of FIG. 10 is shown contents 1001 of a file named "file_time_0.txt" in which values of time are presented, data of one user at a row. The data of time of one user is doubly hierarchized, that is, as shown in FIG. 6 the "time" attribute is an element of a list of attributes of the "log" attribute, which in turn is an element of a list of attributes of the "session" attribute. Thus, data of one row in the contents 1001 can be said to be a list of two degrees in hierarchical depth, or in depth of list nesting. At the bottom of FIG. 10 is shown contents 1002 of a file named "file_x_0.txt" in which values of acceleration in the x-axis direction are presented, data of one user at a row. Since the data of acceleration in the x-axis direction of one user is doubly hierarchized, namely, that is, as shown in FIG. 6 the "x" attribute is an element of the list of attributes of the "log" attribute, which in turn is an element of a list of attributes of the "session" attribute. Thus, data of one row in the contents 1002 can be said to be a list of two degrees in depth of list nesting.

Figure 11:
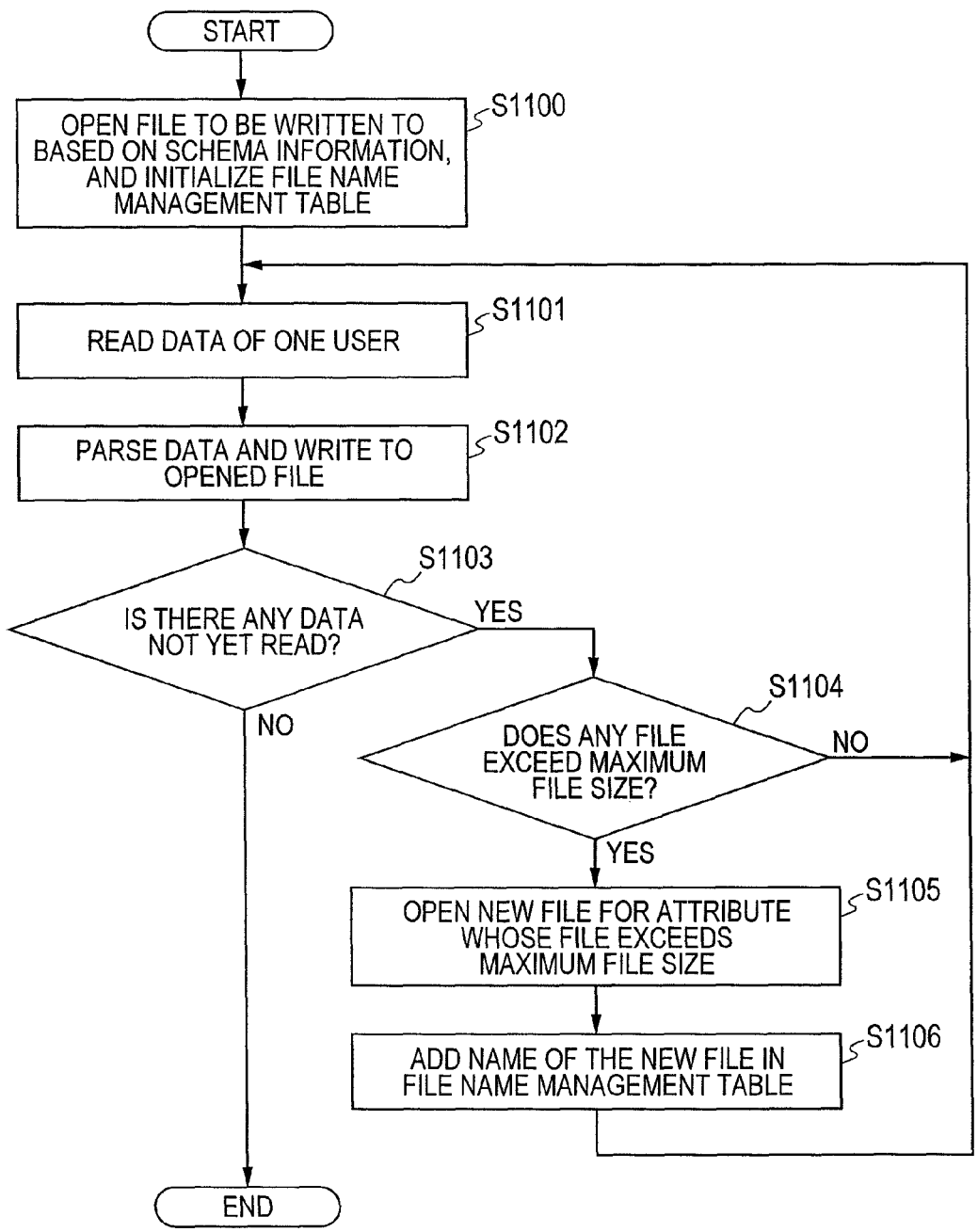
FIG. 11 is a flowchart of data division processing in the second embodiment.

FIG. 11 is a flowchart of the data division processing 103 shown in FIG. 1 that is implemented by the CPU. The flow begins with step S1100 in which a file to which write is to be implemented is opened based on the schema information 105, and the file name management table is initialized. In the specific example of the schema information shown in FIG. 8, files "file_user-id_0.txt", "file_action_0.txt", "file_date_0.txt", "file_time_0.txt", "file_x_0.txt", "file_y_0.txt", and "file_z_0.txt" are opened as files to be written to. Further, the names of the files are written in the file name management table 900. In the case where the schema information shown in FIG. 8 is read, a letter string "user-id" is found at the top of the schema information. Hence, the file named "file_user-id.txt" is opened as a file to be written to, and a record having a value "user-id" in an attribute field and a value "{file_user-id.txt}" in a file name field is added to the file name management table 900.

In the following step S1101, data for a user is read from the hierarchical data 102. In the description below, it is assumed that the hierarchical structure of the read hierarchical data is represented using brackets as shown in FIG. 5. However, the present embodiment is equally applicable to other data formats than that using brackets, which are capable of expressing a hierarchical structure, including XML.

In the next step S1102, a structure analysis is performed on the read hierarchical data 102, and the data 102 is divided by attribute and written to the files. The processing of step S1102 is implemented by invoking a recursive function "parse" with the read hierarchical data 102 being an argument. The recursive function "parse" will be described later by referring to FIG. 12.

In the following step S1103, it is determined whether there is data not yet read. When there is not data not yet read, or all the data have been read, a negative decision (NO) is made in step S1103 and the flow of the data division processing 103 terminates. When there is data not yet read, an affirmative decision (YES) is made in step S1103 and the flow goes to step S1104 to determine whether the size of any of the files to be written to exceeds a predetermined maximal file size. When none of the files exceeds the maximal file size, a negative decision (NO) is made in step S1104 and the flow returns to step S1101. On the other hand, when there is a file whose size exceeds the maximal file size, an affirmative decision (YES) is made in step S1101 and the flow goes to step S1105 to open a new file to be written to for the attribute of which the file size exceeds the maximal file size. For instance, when the size of the file "file_date_0.txt" exceeds the maximal file size, a new file "file_date_1.txt" is opened as a file to be written to. In the subsequent step S1106, the name of the newly opened file to be written to is added to the file name management table 900 with the added name associated with the attribute of which the file size exceeds the maximal file size.

For instance, when the file "file_date_0.txt" exceeds the maximal file size, the value in the file name field of a record in the file management table 900 that has a value "date" in the attribute field is changed to {file_date_0.txt, file_date_1.txt}. The file names are arranged left to right in the order of opening of the files. Thus, when reading the files in the order of the arrangement or left to right, the data for respective users appear or are read in the same order as arranged in the hierarchical data. Further, since the maximal file size is specified, the data are stored by being divided into a plurality of files. This facilitates backup, duplication, and distributed processing of data. Referring back to the flowchart of FIG. 11, after the processing of step S1106, the flow returns to step S1101.

Figure 12:
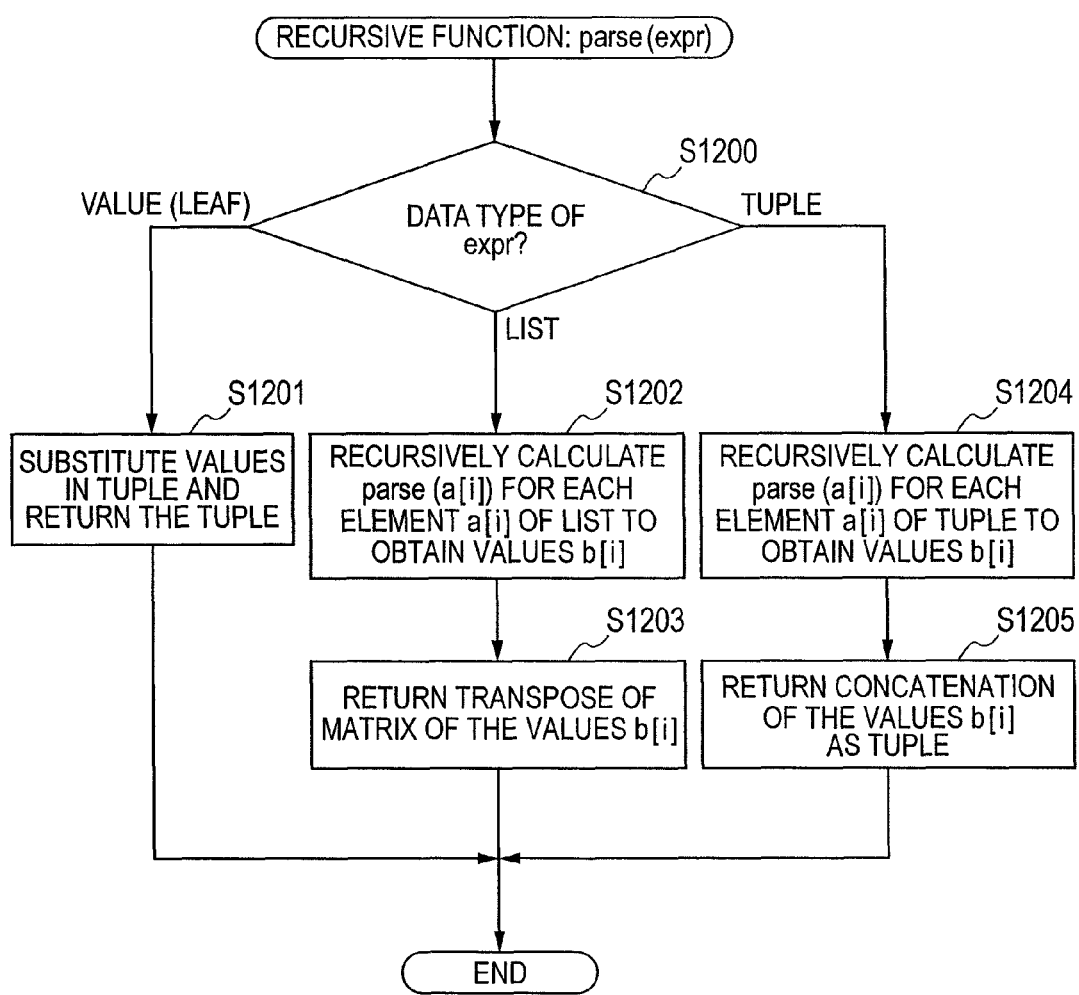
FIG. 12 is a flowchart of a recursive function "parse" in the second embodiment.

FIG. 12 is a flowchart of the recursive function "parse" invoked in the above-described step S1102 in the flowchart of FIG. 11 with the hierarchical data 102 being an argument. The flow begins with step S1200 in which it is determined what type the data at the highest level in the argument is of. When it is determined that the data type of the data at the highest level in the argument is value, the flow goes to step S1201 to substitute the values in the tuple, and returns the tuple. Since the "parse" function is recursively called with respect to the hierarchical data, when the function is called at the lowest level of the hierarchical structure, the argument of the function is always data whose data type is value.

When it is determined in step S1200 that the data type of the data at the highest level in the argument is list, the flow goes to step S1202 in which the function "parse(a[i])" is recursively called with respect to each element a[i] of the list, and the returned values are represented as b[i]. In the following step S1203, b[i] obtained as a result of step S1202 is transposed and returned. That is, for instance, when parse([1 2 3]) is executed in step S1202, the argument is a list and thus the function "parse" is recursively called for each of the elements of the list [1 2 3], i.e., each of 1, 2, 3, to calculate parse(1), parse(2), and parse(3). Since the data type of the argument in parse(1) is value, the flow this time goes from step S1200 to step S1201, and b[0]=(1) is obtained. That is, the value 1 is substituted in the tuple to be returned. Similarly, b[1]=(2), and b[2]=(3) are substituted in the tuple to be returned. Regarding the thus obtained tuple of the values b[i] as a matrix, the transpose of the tuple is obtained as follows:

$$[(1)(2)(3)] \rightarrow ([1 2 3])$$

When the both sides are regarded as a matrix, the former (the left side) is with three rows and one column and the latter (the right side) is with one row and three columns, that is, it is seen that the latter is the transpose of the former.

When it is determined in step S1200 that the data type of the argument is tuple, the flow goes to step S1204 in which parse(a[i]) is recursively called with respect to each element a[i] of the tuple, and the returned values are represented as b[i]. In the following step S1205, the values b[i] obtained as a result of step S1204 are concatenated to form a tuple to be returned. For instance, when parse((1 2 3)) is executed, the argument is of tuple type and thus the function "parse" is recursively called for each of the elements of the tuple (1 2 3), i.e., each of 1, 2, 3, to calculate parse(1), parse(2), and parse (3). Since the data type of the argument in parse(1) is value, the flow this time goes from step S1200 to step S1201, and b[0]=(1) is obtained. That is, the value 1 is substituted in the tuple to be returned. Similarly, b[1]=(2), and b[2]=(3) are substituted in the tuple to be returned. The concatenation of the values b[i] can be expressed as follows:

$$((1)(2)(3)) \rightarrow (1 2 3)$$

Figure 13:
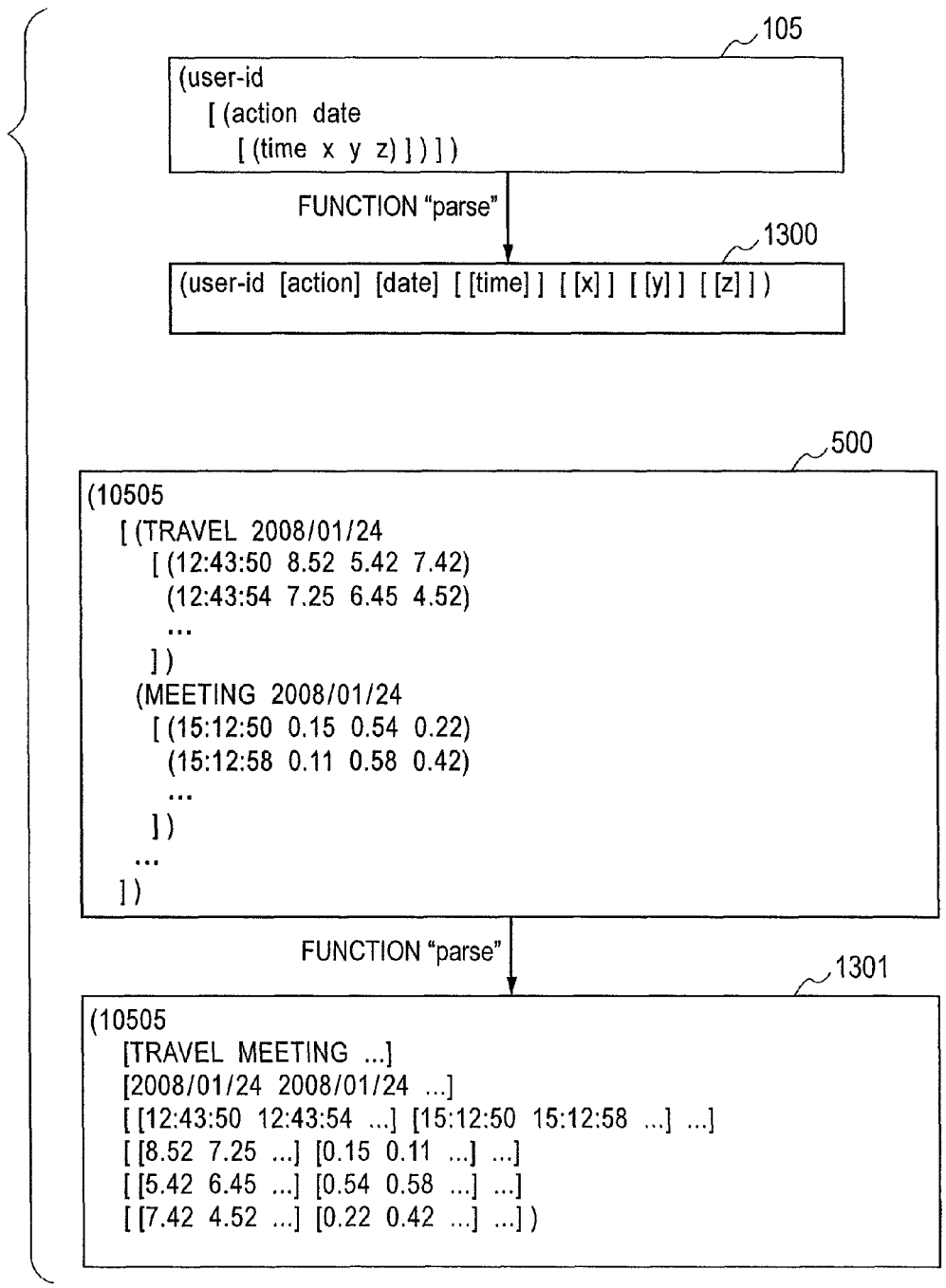
FIG. 13 illustrates an operation of the function "parse"

FIG. 13 illustrates the operation of the "parse" function. As shown in an upper part of FIG. 13, when the "parse" function is applied to the schema information 105, the attribute names in the schema information 105, which correspond to the XML tags in the XML data of FIG. 4, are sequentially extracted. Reference numeral 1300 denotes parsed schema information that is data obtained as a result of the extraction. In the parsed schema information 1300, each of the attribute names is enclosed in a number of pairs of square brackets, which corresponds to the hierarchical depth of the attribute. For instance, in the schema information 105, the attribute "time" is present at two degrees in depth of list nesting. Hence, in the parsed schema information 1300, the attribute "time" is accompanied by two pairs of square brackets.

As shown in a lower part of FIG. 13, when the "parse" function is applied to the hierarchical data 500, the data is outputted in a format in which the data is written to the files, as shown in FIG. 10. The data outputted as a result of the parsing of the hierarchical data 500 is denoted by reference numeral 1301. In the outputted or parsed data 1301, the ordinal data 500 is grouped or divided by attribute. Since the values of the respective attributes are arranged in the parsed data 1301 in accordance with an order in which the names of the attributes are arranged in the parsed schema information 1300, it is obvious what data is to be written to what file.

Figure 14:
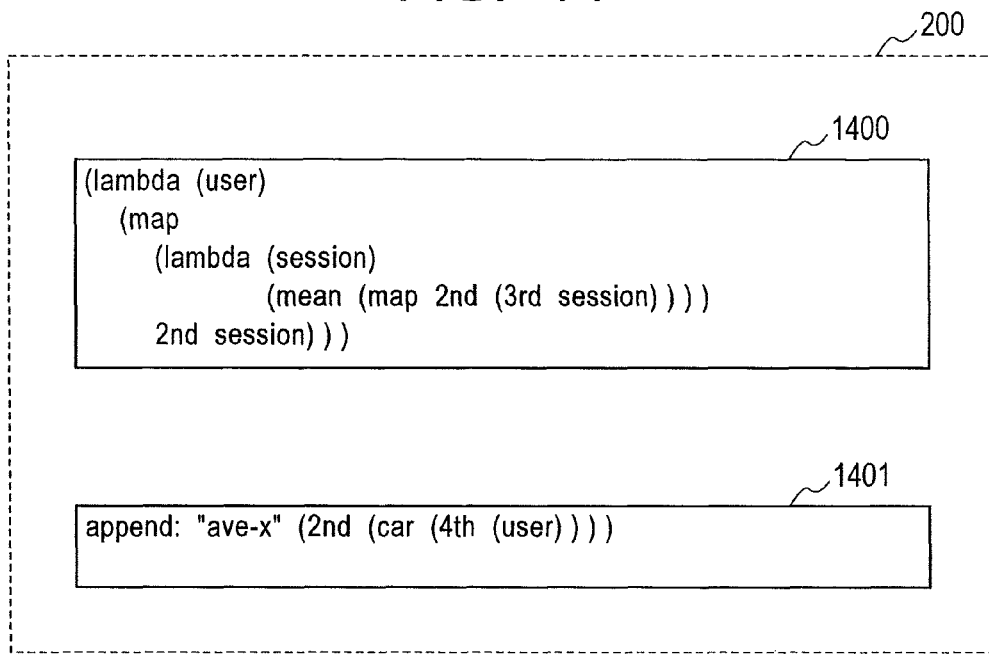
FIG. 14 shows a source code of a data analysis in the second embodiment.

There will be described by way of example a data analysis source code shown in FIG. 14. In the specific example of FIG. 14, the data analysis source code is written in programming language LISP. However, the present embodiment is equally applicable to cases of scripts or source codes written in other programming languages than LISP. Further, the present embodiment is applicable to data analyses of other contents than that in the example of FIG. 14. Reference numeral 1400 denotes a source code describing contents of a data analysis, which is processing to calculate the mean value of acceleration in the x-axis direction in this example. Reference numeral 1401 denotes a source code describing how the value obtained by the processing according to the source code 1400 is to be handled, which is in this example to name the obtained value "ave-x" and add the value "ave-x" to the original data at a position designated by (2nd (car (4th (user)))). "2nd" is a function to return a second element in a tuple, and "3rd" and "4th" are functions to return third and fourth element in a tuple, respectively. The program commands included in the source code 1400 are commonly used with LISP, and detailed description thereof is not provided.

Figure 15:
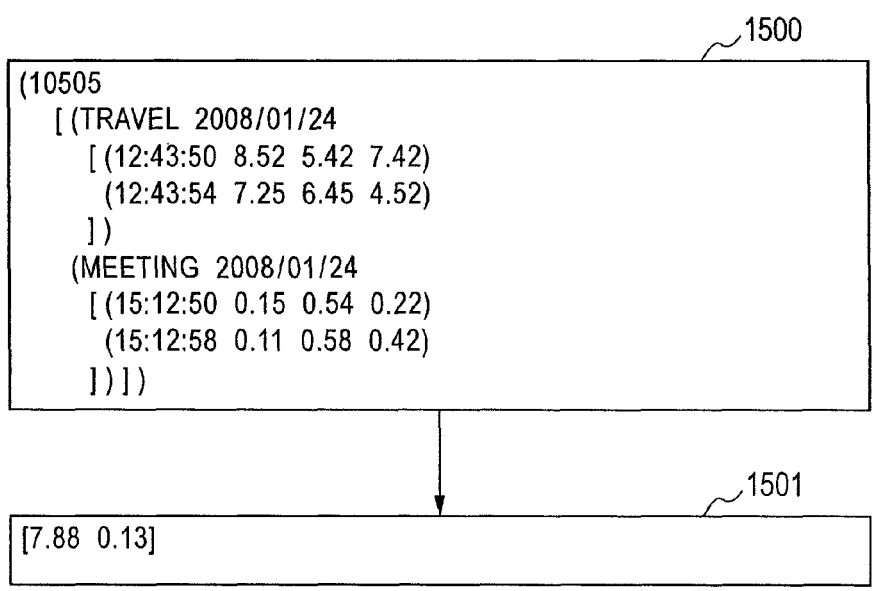
FIG. 15 illustrates an operation of a data analysis program constituted by the source code in the second embodiment.

FIG. 15 shows one example of how a program constituted by the source code 1400 works. When hierarchical data 1500 is inputted to the program constituted by the source code 1400, the mean value of acceleration in the x-axis direction is calculated in units of sessions. As a result of the data analysis, the obtained mean values are outputted in the form of a list 1501.

In the present embodiment, hierarchical data is beforehand divided by attribute, and managed in the form of the attribute data 106 as shown in FIG. 9. Hence, before a data analysis program is applied to the data, it is necessary to restore the data structure thereof.

FIG. 2 is a block diagram of one example of a unit that receives a source code as a script of a data analysis and implements the data analysis. More specifically, based on a data analysis source code 200, and the schema information 105 and the attribute data 106 that are obtained by the processing shown in FIG. 1, hierarchical data 202 is reconstructed by hierarchical-data restoration processing 201. Subsequently, using the data analysis source code 200 and the reconstructed hierarchical data 202, analysis processing 203 is implemented. A result of the analysis processing 203 is stored in the memory portion, or outputted from the output portion. When the analysis processing includes addition of an attribute, the schema information 105 and the attribute data 106 are updated.

Figure 16:
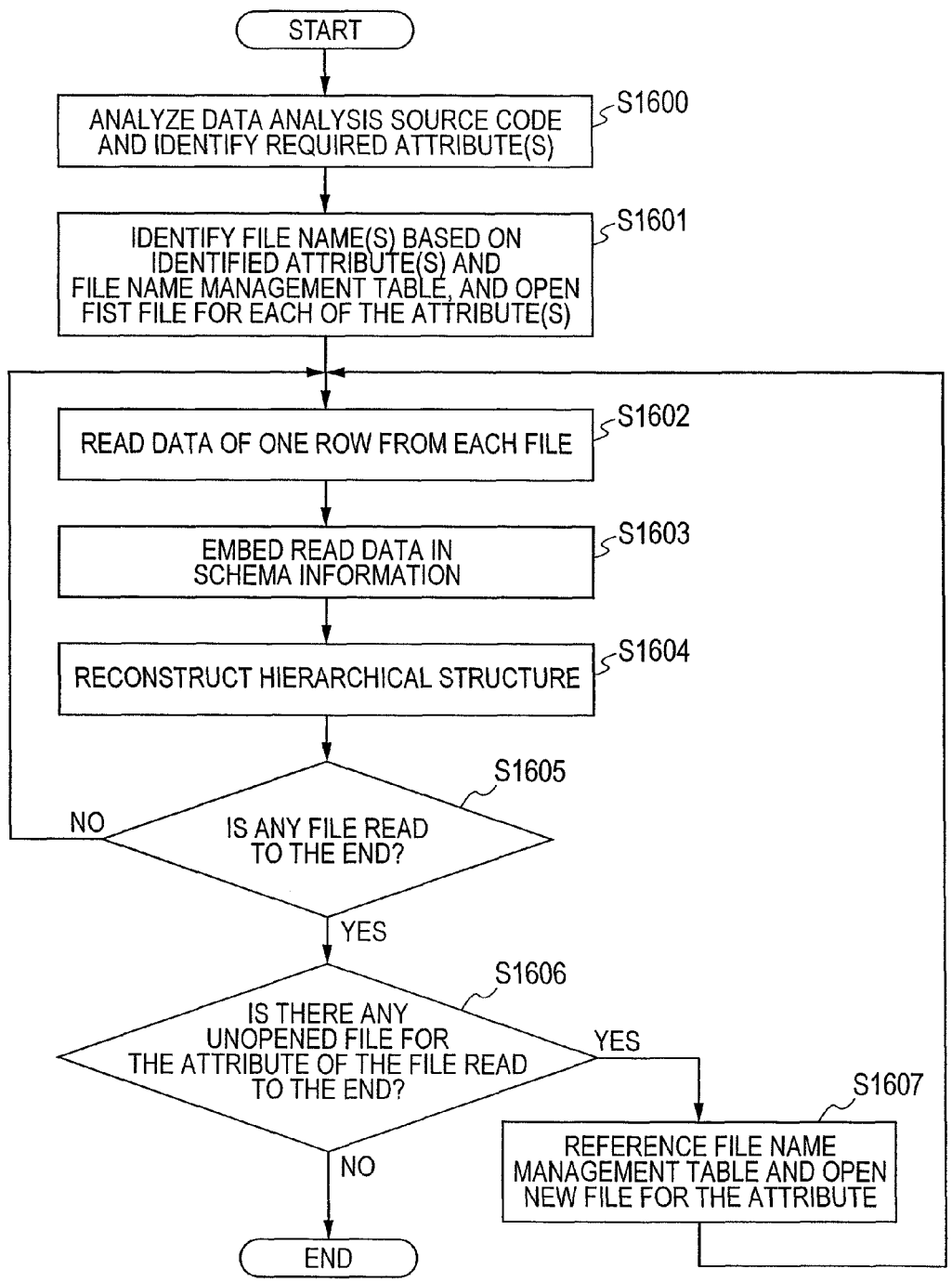
FIG. 16 is a flowchart of a hierarchical-data restoration processing in the second embodiment.
Figure 17:
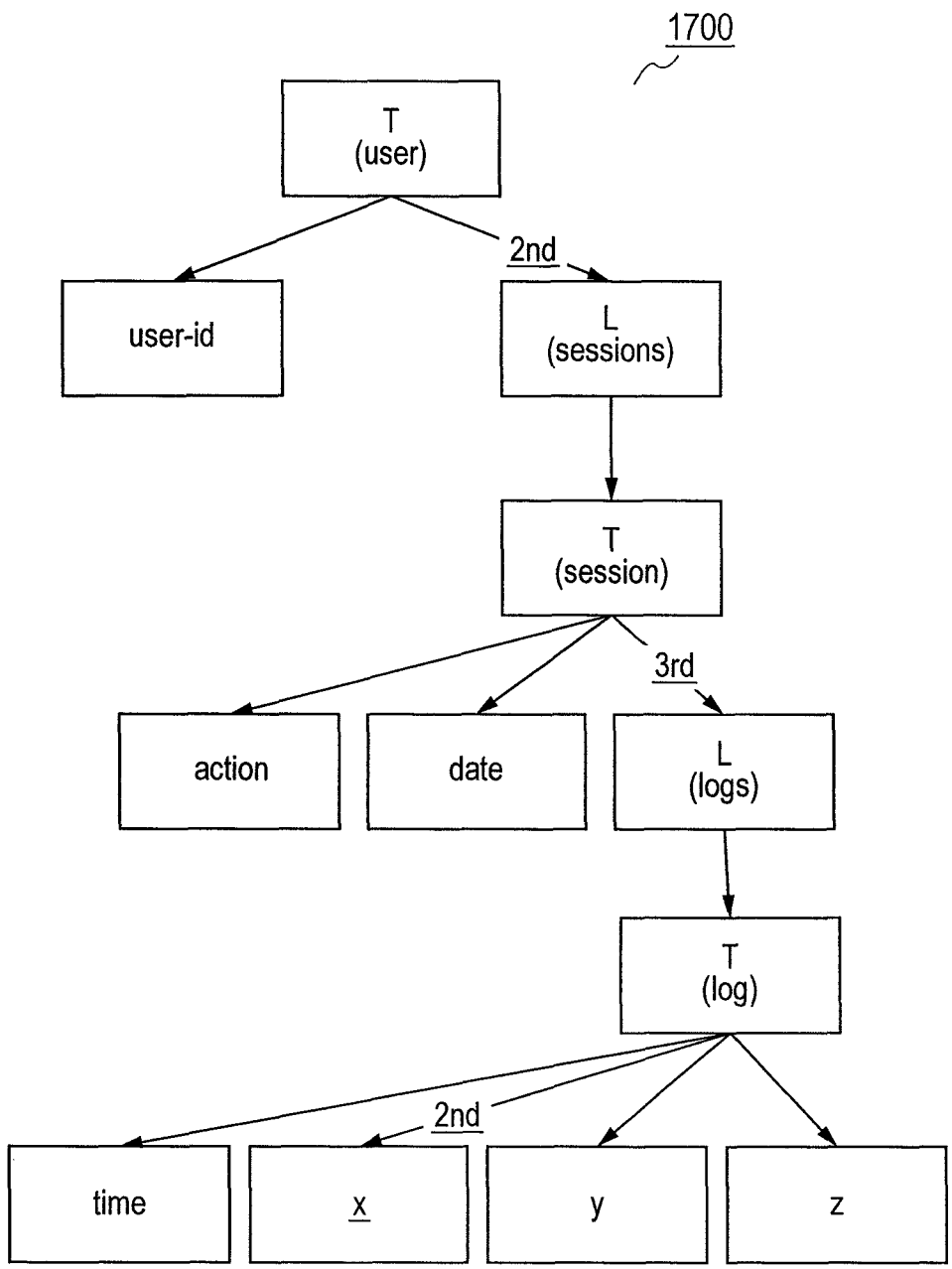
FIG. 17 illustrates a processing to identify an attribute whose data is required in the hierarchical-data restoration processing.

FIG. 16 is a flowchart of the hierarchical-data restoration processing 201. The flow begins with step S1600 in which the data analysis source code 200 is parsed to identify the name of an attribute whose data is required for the processing. For instance, a data analysis program constituted by the source code 1400 shown in FIG. 14 contains functions "2nd", "3rd", and "2nd" for identifying the name of an attribute whose data is required, by sequentially tracing across the hierarchical levels of the data from top downward. Hence, in the schema information 105 shown in FIG. 8, the name of the attribute whose data is required is identified as follows. That is, in the hierarchical structure 1700 of FIG. 17, the second attribute at the highest hierarchical level is initially identified according to the function "2nd". Since the second attribute at the highest level is the list of "sessions", the next function "3rd" is applied to the attributes of the "session" tuple. The third attribute at the second or "session" level is the list of "logs". Thus, the next and last function "2nd" is applied to the attributes of the "log" tuple. In this case, the second attribute at the third or "log" level is the "x" attribute. Thus, finally the name of the attribute whose data is required is identified to be "x". The case of the data analysis program constituted by the source code 1400 in FIG. 14 is such that data of only one attribute is required for data analysis processing. However, the above-described attribute name identification process is equally applicable to a case where data of two or more attributes are required for data analysis processing.

After step S1600, the flow goes to step S1601 in which the name of a file containing data of the attribute whose name is identified as the name of the attribute whose data is required is determined by referencing the file name management table 900, and then the first (or leftmost as seen in the table 900 in FIG. 9) one of the files containing data of the attribute is opened. In this step S1601, when it is the case where the names of two or more attributes are identified as the names of attributes whose data are required in step S1600, the determination of the file name is implemented for each of the attributes whose data are required. Subsequently, the flow goes to step S1602 in which data of one row is read from the opened file. In the example of attribute data shown in FIG. 10, data of one row corresponds to data of one user. At this step S1602, only data of an attribute or attributes whose data is required for the data analysis program is read, meaning that the embodiment succeeds in reducing an amount of data input as compared to the case where data of all the attributes are read. In the specific example of the data analysis source code 1400 shown in FIG. 14, although four attributes are present at the lowest level, data of only one of the four attributes is read. Thus, the amount of data input is reduced to ¼ as compared to a case where data of all the four attributes are read.

Figure 18:
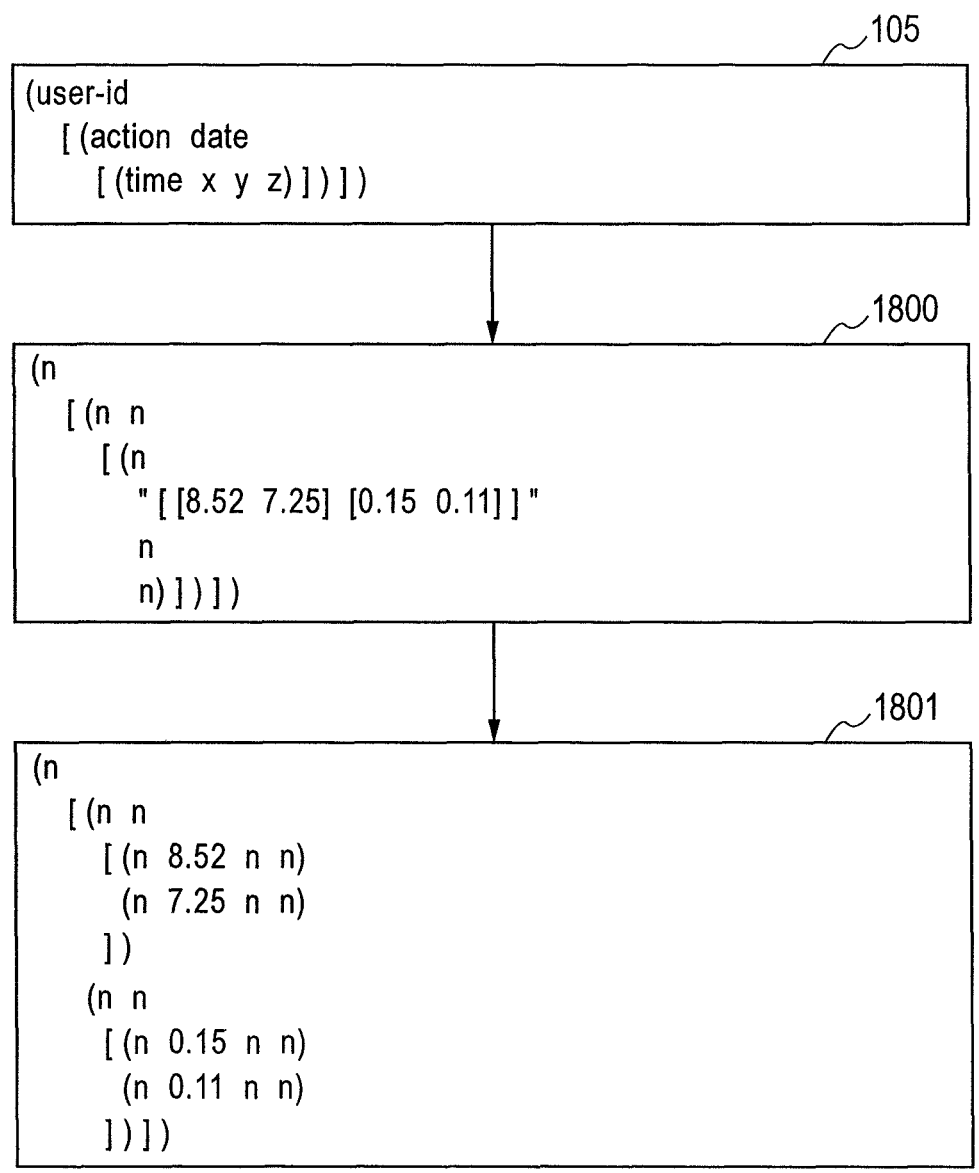
FIG. 18 illustrates an operation of the hierarchical-data restoration processing.

In the following step S1603, the data read from the file is embedded in the schema information 105. Subsequently, the hierarchical structure is restored in step S1604. FIG. 18 illustrates one example of processing of steps S1603 and S1604. Data 1800 shown in FIG. 18 is obtained by reading data of one user from a file "file_x 0.txt" (1002 in FIG. 10) in step S1603, and embedding the thus obtained data in the schema information 105. That is, the data of one row read from the file "file_x 0.txt" is inserted with quotation marks in the schema information 105 at the position of "x". At other positions in the schema information 105, "n"s are inserted in place of attribution names. Data 1801 in FIG. 18 is obtained by restoring the hierarchical structure by processing of step S1604. More specifically, in step S1604, a recursive function "build" is invoked with the data 1800 being an argument. The recursive function "build" will be described later by referring to FIG. 19. Since the data 1801 is obtained by merely replacing, by n, values in the original data 1500 other than a value to be used or required in the following analysis processing. Hence, a result obtained by applying the data analysis program constituted by the source code 1400 to the data 1801 becomes the same as a result obtained by applying the program to the data 1500.

Referring back to FIG. 16, the rest of the flow of the hierarchical-data restoration processing 201 will be described. After step S1604, the flow goes to step S1605 in which it is determined whether any file is read to the end. When it is determined in step S1605 that there is not a file read to the end, a negative decision (NO) is made and the flow returns to step S1602. On the other hand, when it is determined in step S1605 that a file is read to the end, an affirmative decision (YES) is made and the flow goes to step S1606. In step S1606, it is determined whether there is an unopened file of the attribute of which a file has been determined to be read to the end in step S1605. When it is determined in step S1606 that there is not an unopened file of the attribute of which a file has been determined to be read to the end, a negative decision (NO) is made and the flow is terminated. On the other hand, when it is determined in step S1606 that there is an unopened file of the attribute, the flow goes to step S1607 to reference the file name management table 900 and open the next file, i.e., a file immediately to the right of the currently opened file, of the attribute, and then the flow returns to step S1602. By sequentially opening the files having the names listed in the file name field in the file name management table 900, which field corresponds to the name of the attribute whose data is required, from left to right, and reading the data of the opened file row by row, the data of respective users can be read in the same order as the data of the users are arranged in the hierarchical data. When data of two or more attributes are required and read, the arrangement where the files of the respective attributes are opened sequentially from left to right and are read row by row results in that data of the attributes being read at a time point is of a same user. Thus, by simply reading the contents of the files continuously, correspondence between or among data of the attributes of each same user is maintained. This makes it unnecessary to implement processing like JOIN in a RDB system, which contributes to speed up the data reading.

Figure 19:
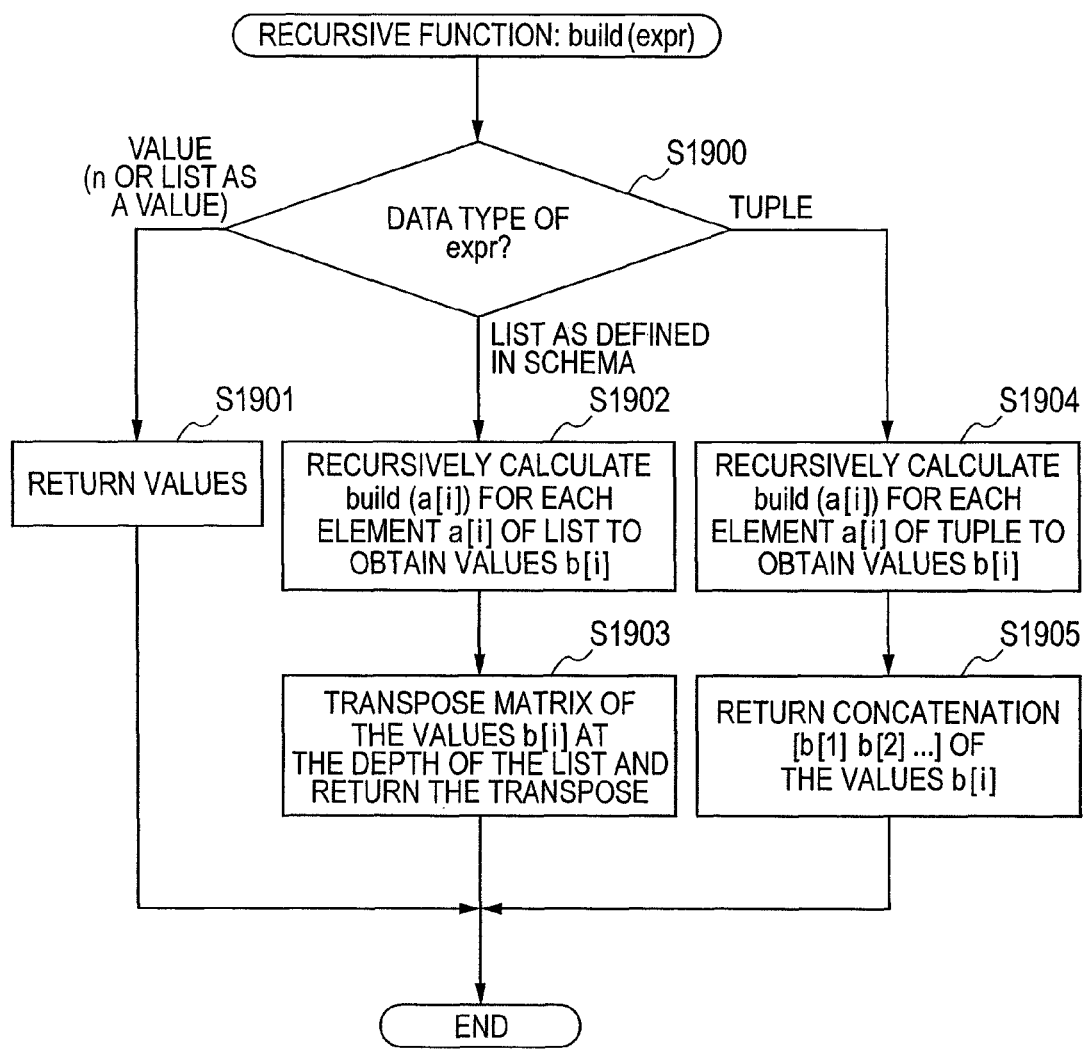
FIG. 19 is a flowchart of a recursive function "build" in the second embodiment.

FIG. 19 is a flowchart of the recursive function "build" invoked in step S1604, in which the argument is the data 1800 obtained by embedding the attribute data in the schema information 105. The flow begins with step S1900 in which it is determined what type the data at the highest level of the argument is of. When it is determined in step S1900 that the type of the argument is value, namely, n or quoted list, the flow goes to step S1901 to return the argument itself. Since the "build" function is recursively called with respect to the hierarchical data, when the function "build" is called at the lowest level of the hierarchical structure, the data type of the argument is value, n, or quoted list. When it is determined in step S1900 that the data type of the argument is list without quotation marks, the flow goes to step S1902 in which a function "build(a[i])" is recursively called with respect to each of the elements a[ ] of the list, and the returned values are represented by b[i]. In the subsequent step S1903, a matrix of the values b[i] obtained in step S1902 is transposed at the depth of list nesting of the argument, and returned. The processing in step S1903 will be later described in more detail by referring to FIG. 20.

When it is determined in step S1900 that the data type of the argument is tuple, the flow goes to step S1904 in which the function "build(a[i])" is recursively called with respect to each of the elements a[i] of the tuple, and the returned values are represented by b[i]. In the subsequent step S1905, a list of the values b[i] obtained in step S1904 is returned.

Figure 20:
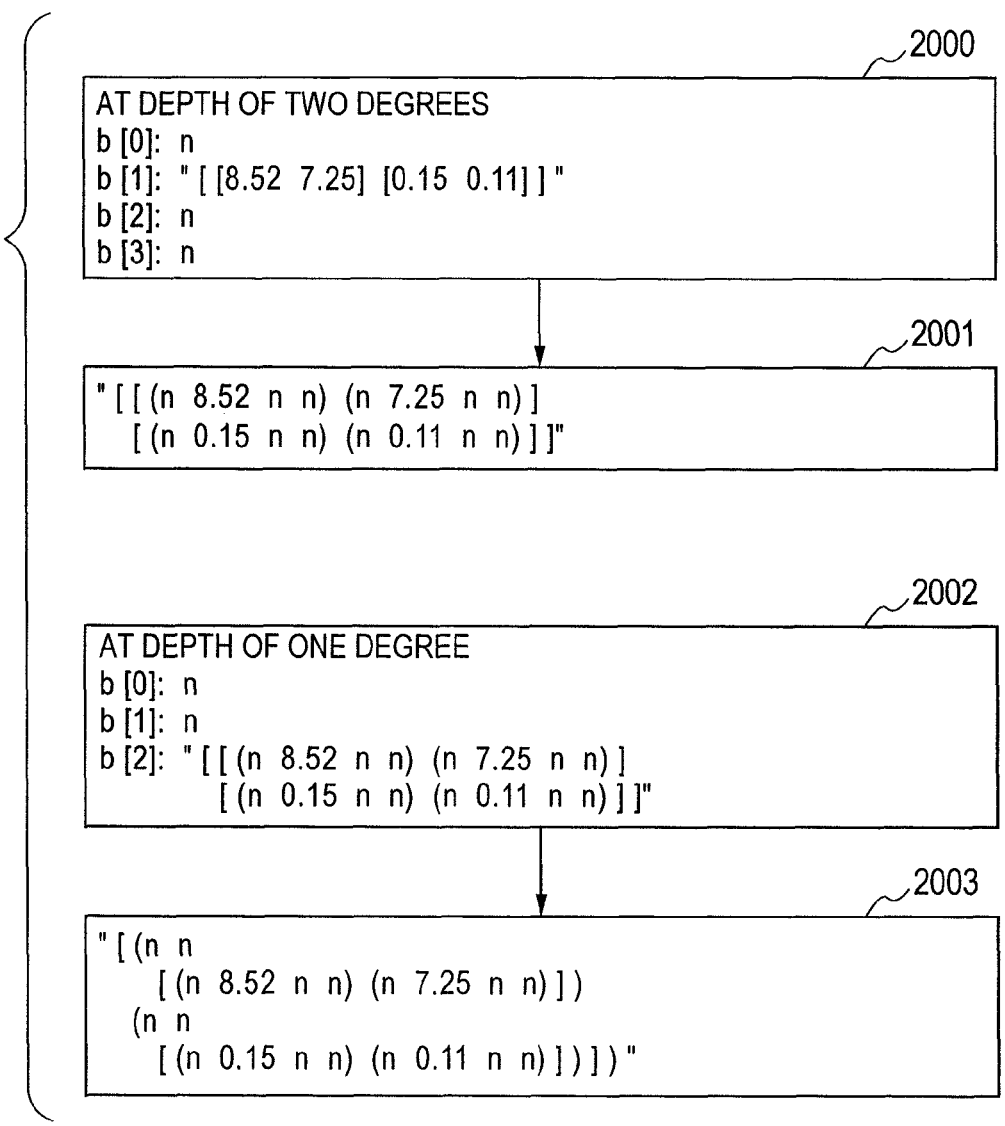
FIG. 20 illustrates one example of a transposition processing with the depth designated.

There will be described, by way of example, the processing of step S1903 where the "build" function is applied to the data 1800 shown in FIG. 18. The "build" function is recursively called. Considering processing of calling a function build((n "[[8.52 7.25][0.15 0.11]]" n n)), since in the data 1800 the tuple (n "[[8.52 7.25][0.15 0.11]]" n n) is enclosed in two pairs of square brackets, the depth of list nesting of the argument (n "[[8.52 7.25][0.15 0.11]]" n n) is two degrees. When the function build((n "[[8.52 7.25][0.15 0.11]]" n n)) is executed, step S1904 is first implemented to execute the function "build" on each of the elements of the tuple (n "[[8.52 7.25][0.15 0.11]]" n n). Since all the elements are n or a quoted list, the flow goes to step S1901 to return these values as they are. As shown in the upper part of FIG. 20 with reference numeral 2000, b[0]=n, b[1]="[[8.52 7.25][0.15 0.11]]", b[2]=n, b[3]=n are returned. When step S1903 is implemented subsequently, a matrix of the values b[i] is transposed at two degrees in depth since the depth of list nesting of the argument (n "[[8.52 7.25][0.15 0.11]]" n n) is two degrees as described above. As a result is obtained the following list, as shown in FIG. 20 with reference numeral 2001:

"[[(n 8.52 n n)(n 7.25 n n)][(n 0.15 n n)(n 0.11 n n)]]"

At this stage, when some elements lack, n(s) is/are automatically added.

On the other hand, if the matrix of the values b[i] (denoted by 2000) is transposed at one degree in depth, the following list would be obtained:

"[(n [8.52 7.25] n n)(n [0.15 0.11] n n)]"

When comparing the lists obtained as a result of the transposition processing at one degree and two degrees in depth, respectively, it is seen that in the list obtained by the transposition at two degrees in depth the tuples are at two degrees in depth of list nesting. A known method is employed in implementing the transposition processing with the depth designated at which the transposition processing is to be implemented. For instance, formula manipulation software Mathematica offers a built-in function enabling transposition with the depth designated.

Subsequently, when a function build ((n n "[[(n 8.52 n n)(n 7.25 n n)][(n 0.15 n n)(n 0.11 n n)]]")) is called, the depth of list nesting of the argument is one degree. Hence, a matrix of values b[i] (shown in FIG. 20 with reference numeral 2002) obtained by recursively calling the function "build" is transposed at one degree in depth. As a result, data 2003 shown in FIG. 20 is obtained.

Figure 21:
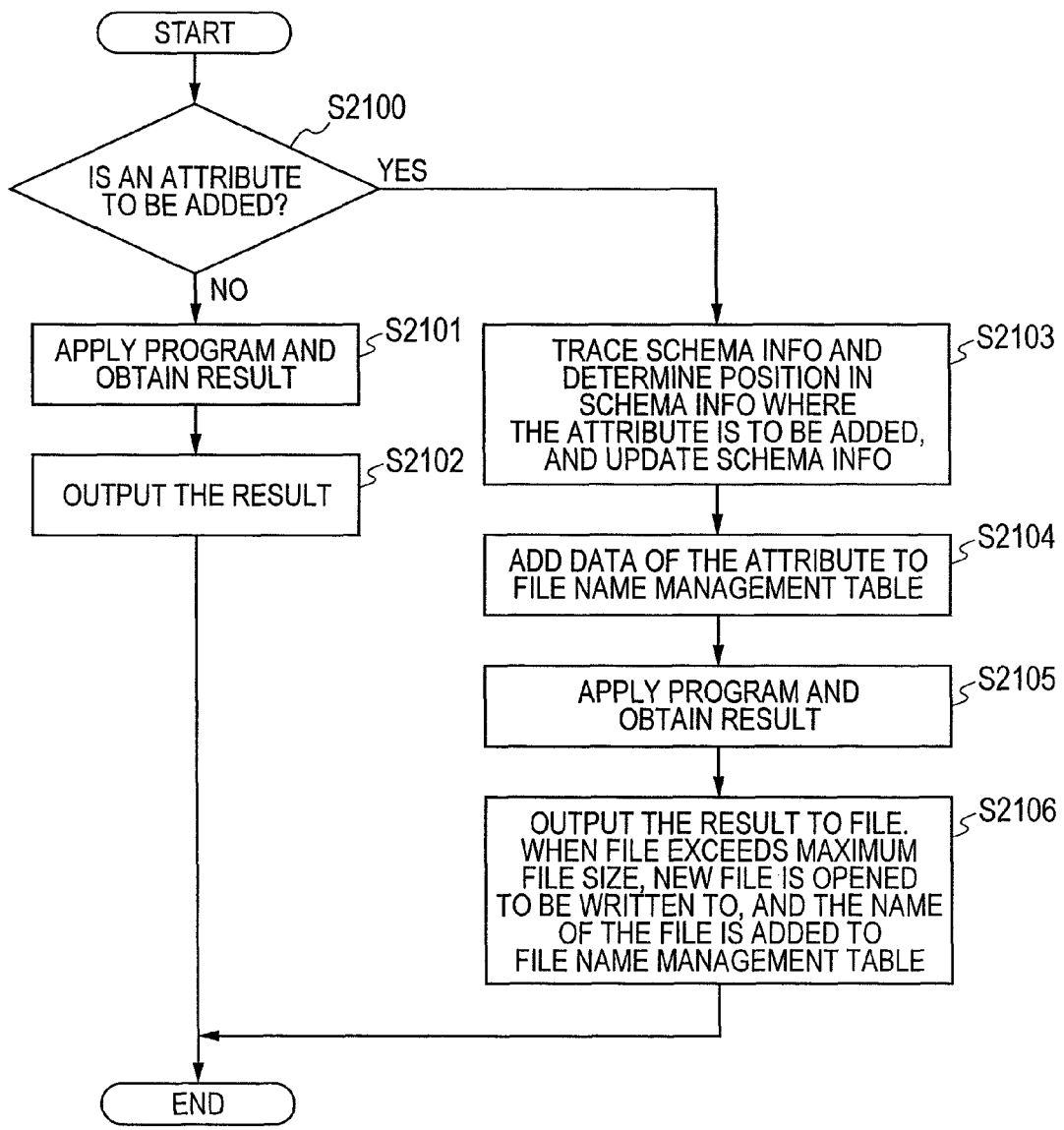
FIG. 21 is a flowchart of an analysis processing in the second embodiment.

FIG. 21 is one example of a flowchart of the analysis processing 203 shown in FIG. 2. The flow begins with step S2100 in which it is determined whether the analysis to be made involves addition of an attribute. When it is determined that the analysis to be made does not involve addition of an attribute, a negative decision (NO) is made in step S2100 and the flow goes to step S2101 to apply the data analysis source code 200 to the hierarchical data 202 reconstructed by the hierarchical-data restoration processing 201, to obtain a result of the analysis, which is outputted in the following step S2102.

Figure 22:
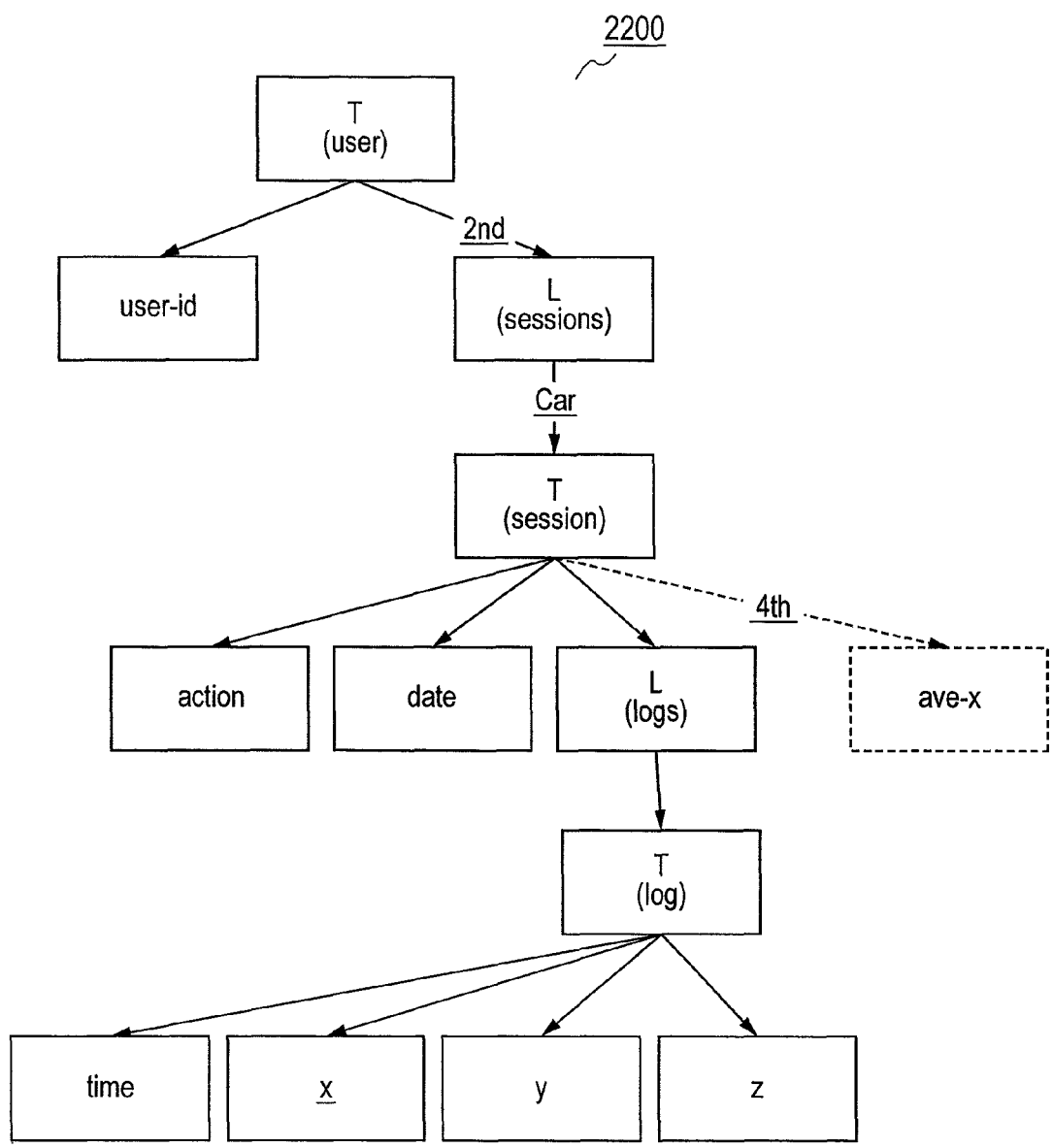
FIG. 22 illustrates a processing to identify the position in a schema at which an attribute is to be added, in the second embodiment.

On the other hand, when it is determined in step S2100 that the analysis to be made involves addition of an attribute, an affirmative decision (YES) is made and the flow goes to step S2103 in which the position in the schema at which the attribute is to be added is identified by tracing the schema information 105, and then the schema information 105 is updated accordingly. For instance, in the case of the data analysis processing shown in FIG. 14, a schema structure 2200 shown in FIG. 22 is traced based on the information (2nd (car (4th (user)))) included in the source code 1401, to identify the position at which a new attribute "ave-x" is to be added. In FIG. 22, the new attribute "ave-x" is added at the position where a block of broken line is located, and the schema information 105 is accordingly updated, to be:

(user
 [ (action date
  [ (time x y z) ]
  ave-x) ] )

Step S2103 is followed by step S2104 in which information of the added attribute is added to the file name management table 900. In the specific case where the attribute "ave-x" is added, a record having a value "ave-x" in the attribute field and a value {file_ave-x__0.txt} in the file name field is added to the file name management table 900. The flow then goes to step S2105 in which the data analysis source code 200 is applied to reconstructed hierarchical data, and a result of the analysis is obtained.

In the subsequent step S2106, the obtained result is outputted to a file. In this step, each time the file exceeds a predetermined maximum file size, a new file is opened to be written to, and the name of the newly opened file is added to the file name management table 900, like in the data division processing 103. The arrangement where addition of a new attribute is implemented by updating the schema information 105 is advantageous in that it is unnecessary to output the entire data to a file, and only data of the newly added attribute should be outputted to a file, thereby reducing an amount of output to file.

In the case where it is determined in step S2100 that the analysis to be made does not involve addition of an attribute, the result obtained by the analysis in step S2101 is outputted to the output portion (S2102) or the memory portion 2404 or 2405.

Third Embodiment

There will be described a data processing device according to a third embodiment of the invention. The data processing device of the third embodiment operates in a distributed computing environment in which a plurality of computers work, and is capable of performing data analysis processing on hierarchical data at high speed. As the computers, the computer 2400 shown in FIG. 24 and described with respect to the first embodiment may be used, for instance.

The data processing device of the third embodiment will described below. Each of the computers of the data processing device of the present embodiment holds in its memory portion the schema information 105 and the attribute data 106, receives a source code as a script of a data analysis, and implements the data analysis by its CPU.

Figure 23:
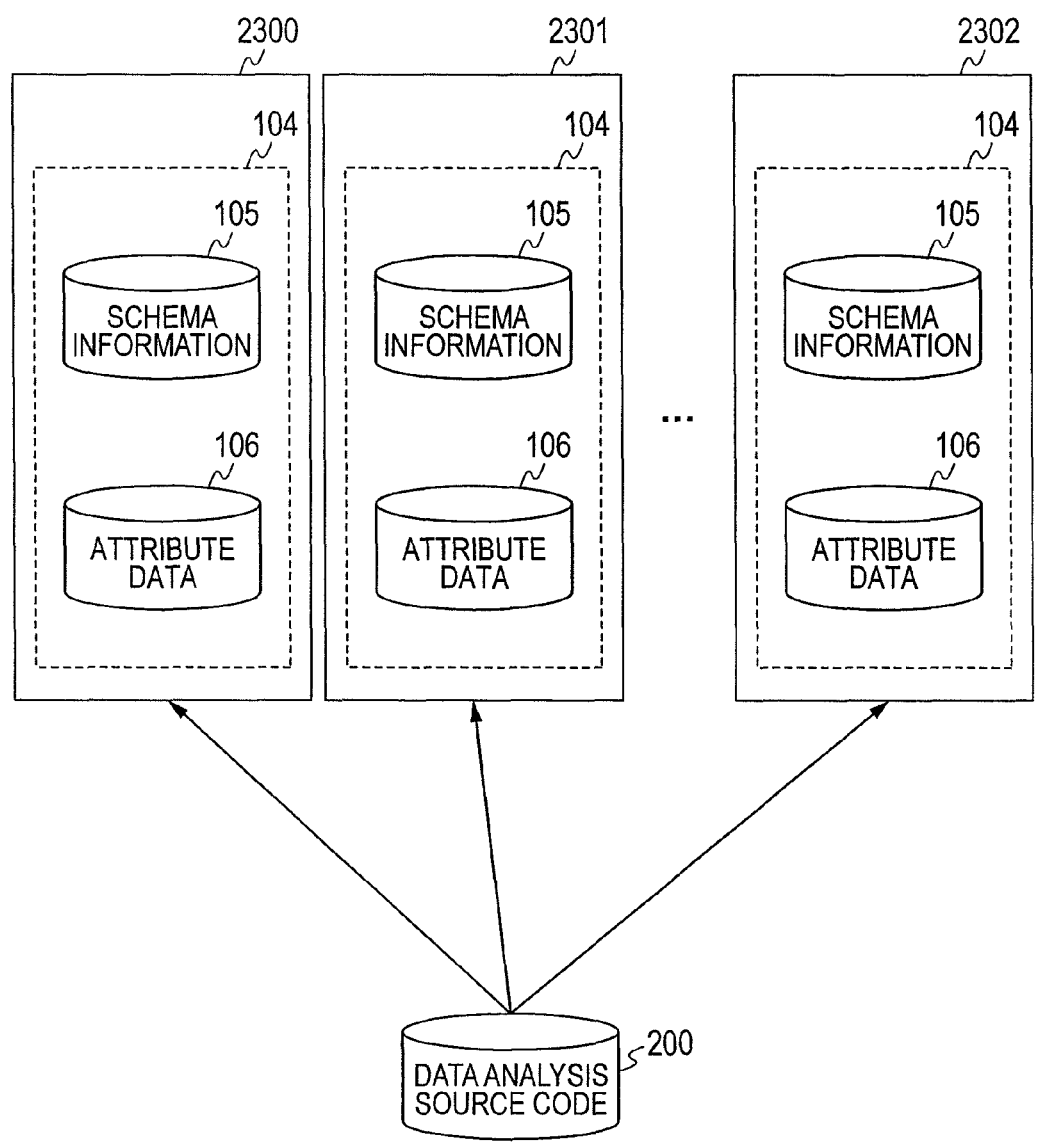
FIG. 23 is a block diagram of a system in a distributed computing environment, according to a third embodiment of the invention.

FIG. 23 is a block diagram schematically illustrating the apparatus of the third embodiment. Reference numerals 2300, 2301, and 2302 denote computers of a number n that cooperate to constitute a distributed computing environment. For instance, a computer 2300 is a first computer, a computer 2301 is a second computer, and a computer 2303 is an nth computer. As these computers, a general-purpose computer such as one shown in FIG. 24 and described above with respect to the first embodiment may be used. Each of the computers holds the schema information 105 and the attribute data 106. Upon receiving from a client the data analysis source code 200, each of the computers implements a data analysis by a unit shown in FIG. 2. The apparatus of the present embodiment is applicable to various known distributed computing systems. For instance, the apparatus can be implemented in MapReduce distributed computing environment.

Further, each of the computers 2300 to 2302 in the distributed computing environment may have the unit shown in FIG. 1 to be able to implement thereon the hierarchization processing 101 and the data division processing 103. In such an arrangement, raw data 100 is beforehand provided to the computers of the distributed computing environment, and each of the computers performs the hierarchization processing 101 and the data division processing 103 thereon. This arrangement is applicable to various known distributed computing systems. For instance, the arrangement can be implemented in MapReduce distributed computing environment.

According to the embodiments of the invention, a user interface enabling a user to easily implement processing on a large volume of hierarchical data is provided. Further, the user interface presents a user a large volume of hierarchical data with the names of levels and attributes in a way to facilitate the user's comprehension of the structure, meaning, and format of the data. Still further, a user can hide or make disappear, by an operation by the user, data of a desired level in hierarchical data being presented on the user interface, thereby facilitating the user's comprehension of the hierarchical structure of the data. Therefore, even when data on which a user desires to implement analysis processing has a complex hierarchical structure with a large number of attributes, the user can implement the processing without being confused.

Further, it is enabled to implement a test implementation of analysis processing on a part of data before an actual implementation of the processing is performed on the entirety of the data. Hence, the user can verify that the command of the analysis is described correctly to give a result as intended, prior to the actual implementation of the analysis processing over the entire data. Thus, the user can find an error in the command of the analysis in a short time, thereby enabling smooth analysis. Further, since the result of the test implementation is immediately presented, the user can consider how to implement the next analysis using the result of the test implementation while waiting for termination of computation of the actual implementation.

Further, in implementing processing on hierarchical data, it is enabled to continuously read only a part of the data that is required for the processing, thereby reducing the amount of reading file and enhancing the processing speed. In particular, an increase in the number of fields does not extremely decrease the processing speed.

Further, when processing to add a field is implemented, it is unnecessary to write all the fields, but only the field to be added can be outputted to a new file. This reduces the amount of data write, thereby enhancing the processing speed. Since the apparatus of the embodiments is applicable, without being modified, to a distributed computing environment such as MapReduce, the apparatus can enhance the processing speed by distributed processing.

Although several embodiments have been described above, the invention is not limited to the details of the embodiments. As disclosed in the specification and appended drawings, the invention can take various forms other than those defined in the appended claims. For instance, the following forms are also disclosed.

A data processing device including:

a memory portion storing hierarchical data and display data obtained by converting the hierarchical data, the hierarchical data being data having a hierarchical structure with tuples and lists, each of the tuples being a combination of data of different data types, and each of the lists being a series of data of a same data type;

a user interface portion which receives an instruction requesting processing from a user, and presents the display data and a result of the processing to the user;

a data managing portion which manages the hierarchical data;

a display-data generating portion which generates the display data by converting the hierarchical data; and an analysis processing portion which receives the instruction from the user interface portion and implements analysis processing;

the user interface portion presenting the hierarchical data in a table format having a row to display names of respective levels and a row to display a name of an attribute;

the display-data generating portion sampling data of each level of the hierarchical data to extract a part of the hierarchical data by an amount possible to present on the user interface portion, and converting the format of the data extracted by the sampling;

the data managing portion including:

a hierarchization processing portion which outputs hierarchical data and schema information, based on raw data, the hierarchical data being obtained by hierarchizing the raw data to have a hierarchical structure with tuples and lists, each of the tuples being a combination of data of different data types, and each of the lists being a series of data of a same data type, and the schema information being indicative of a data structure of the hierarchical data;

a data division processing portion which outputs attribute data, based on the hierarchical data and the schema information, the attribute data being obtained by dividing the hierarchical data by attribute; and a hierarchical-data restoration processing portion which restores the original hierarchical structure of the hierarchical data based on a data analysis script describing data analysis processing, the schema information, and the attribute data, and outputs the reconstructed hierarchical data;

the data managing portion storing in the memory portion the schema information outputted from the hierarchization processing portion, and the attribute data outputted from the data division processing portion; and the attribute data stored in the memory portion including a group of files and a file name management table for managing names of the files, each of the files containing data of a single attribute.

The data processing device described above in independent form, wherein the data of the attribute contained in each of the files is hierarchized in a list structure, in accordance with a depth of the attribute in list nesting of the schema information.

The data processing device described above in independent form, wherein the group of files is such that files of each same attribute are ordered such that when files of two given attributes are respectively sequentially opened in the predetermined order and the data contained therein are read in units of an appropriate amount, a correspondence between data of the two attributes in the hierarchical data can be restored.

The data processing device described above in independent form, wherein although the schema information contains the data type of each element of the hierarchical data, as to the data types of the elements of each of the lists the schema information contains the data type of only a first appearing one of the elements.

The data processing device described above in independent form, wherein a maximum file size is predetermined for each of the files.

The data processing device described above in independent form, wherein the analysis processing portion updates the schema information and the file name management table, and is capable of implementing attribute addition processing.

The data processing device described above in independent form, wherein in a distributed computing environment including a plurality of computers, each of the computers has the hierarchical-data restoration processing portion and the analysis processing portion.

The data processing device described above in independent form, wherein the display-data generating portion receives the attribute data and generates the display data based on the attribute data, without restoring the original hierarchical structure.

The invention is effective as a data processing device, and particularly as a processing technique capable of implementing at high speed a data analysis processing on a large volume of hierarchical data.

What is claimed is:

1. A data processing device comprising:
a data managing portion which manages hierarchical data having a hierarchical structure with tuples and lists, each of the tuples being a combination of data of different data types, each of the lists being a series of data of a same data type, and at least one attribute among a plurality of attributes that compose a tuple in a level of the hierarchical structure being a list of data in a lower level of the hierarchical structure;
a user interface portion which receives hierarchical data, display data obtained by converting the hierarchical data, and an instruction requesting analysis processing on the hierarchical data from a user, and presents the display data and a result of the analysis processing to the user;
a display-data generating portion which generates the display data by converting the hierarchical data;
an analysis processing portion which receives the instruction from the user interface portion, and implements analysis processing on the hierarchical data in accordance with the received instruction;
the user interface portion displaying the display-data; wherein
the display-data generating portion samples data of each level of the hierarchical data to extract a part of the corresponding level of the hierarchical data by an amount possible to present on the user interface portion, and converts the extracted data into the display data of a table format having a level-name row for presenting names of respective levels of the hierarchical data, an attribute-name row for presenting names of attributes composing each tuple in respective levels of the hierarchical data, and a plurality of rows for presenting values of the attributes composing the each tuple in respective levels of the hierarchical data.

2. The data processing device according to claim 1, wherein the user interface portion makes disappear, in accordance with the instruction, data of a desired level in the hierarchical data being presented on the user interface portion.

3. The data processing device according to claim 1, wherein the analysis processing portion implements the analysis processing on only a part of the hierarchical data that is converted into display data, before implementing the analysis processing on an entirety of the hierarchical data, and presents on the user interface portion a result of the analysis processing implemented on the part of the hierarchical data.

4. The data processing device according to claim 1, wherein when the instruction that the user interface portion receives from the user is an instruction to implement attribute addition processing, the display-data generating portion inserts a column of a newly added attribute in the table format.

5. The data processing device according to claim 1,
wherein the data managing portion includes:
a hierarchization processing portion which outputs hierarchical data and schema information, based on raw data, the hierarchical data being obtained by hierarchizing the raw data to have a hierarchical structure with tuples and lists, each of the tuples being a combination of data of different data types, and each of the lists being a series of data of a same data type, and the schema information being indicative of a data structure of the hierarchical data;
a data division processing portion which outputs attribute data, based on the hierarchical data and the schema information, the attribute data being obtained by dividing the hierarchical data by attribute; and
a memory portion which stores the schema information outputted from the hierarchization processing portion, and the attribute data outputted from the data division processing portion, and
wherein the attribute data stored in the memory portion includes a group of files and a file name management table for managing names of the files, each of the files containing data of a single attribute.

6. The data processing device according to claim 5, wherein the data of the attribute contained in each of the files is hierarchized in a list structure, in accordance with a depth of the attribute in list nesting in the schema information.

7. The data processing device according to claim 6, wherein the group of files is such that files of each same attribute are ordered such that when files of two given attributes are respectively sequentially opened in a predetermined order and the data contained therein are read in units of an appropriate amount, a correspondence between data of the two attributes in the hierarchical data can be restored.

8. The data processing device according to claim 6, wherein although the schema information contains the data type of each element of the hierarchical data, as to the data types of the elements of each list the schema information contains the data type of only a first appearing one of the elements.

9. The data processing device according to claim 5, wherein a maximum file size is predetermined for each of the files.

10. The data processing device according to claim 5, wherein in a distributed computing environment including a plurality of computers, each of the computers has the hierarchization processing portion and the data division processing portion.

11. The data processing device according to claim 1, wherein the user interface portion has an attribute addition button located in the row for presenting the names of the levels of the tuples in the table format, the attribute addition button being operated when an attribute is to be added.

12. The data processing device according to claim 1, wherein the user interface portion has a collapse button located in the row for presenting the names of the levels of the tuples in the table format, the collapse button being operated when the rows presenting the lists are to be made partially disappear.

13. The data processing device according to claim 1, wherein the user interface portion has an aggregate button located in the row for presenting the names of the attributes of the tuples in the table format, the aggregate button being operated when data of the rows presenting the lists are to be aggregated.

14. The data processing device according to claim 1, wherein the memory portion stores, in files, attribute data which are data of the respective attributes of the tuples, each of the files containing data of only a single attribute.

15. The data processing device according to claim claim 14, wherein the processing portion generates the display data, based on the attribute data stored in the files.

16. The data processing device according to claim claim 14,
wherein the user interface portion has aggregate buttons in the table format at positions corresponding to the respective columns of the attributes of the tuples and in the row for presenting the names of the attributes, each of the aggregate buttons being operated when data of the rows presenting the list of the corresponding attribute are to be aggregated, and wherein when one of the aggregate buttons is operated, the processing portion implements an aggregate calculation, based on the attribute data corresponding to the operated aggregate button.

17. A data processing device comprising:

a data managing portion which manages hierarchical data having a hierarchical structure with tuples and lists, each of the tuples being a combination of data of different data types, each of the lists being a series of data of a same data type, and at least one attribute among a plurality of attributes that compose a tuple in a level of the hierarchical structure being a list of data in a lower level of the hierarchical structure;

a user interface portion which receives hierarchical data, display data obtained by converting the hierarchical data, and an instruction requesting analysis processing on the hierarchical data from a user, and presents the display data and a result of the analysis processing to the user;

a display-data generating portion which generates the display data by converting the hierarchical data;

an analysis processing portion which receives the instruction from the user interface portion, and implements analysis processing on the hierarchical data in accordance with the received instruction;

the user interface portion displaying the display-data; wherein the display-data generating portion generates using a sampling subset including data of each level of the hierarchical data to extract a part of the corresponding level of the hierarchical data, the sampling subset corresponding to a data amount currently immediately displayable on the user interface portion, and converts the data extracted by the sampling into the display data of a table format having a level-name row for presenting names of respective levels of the hierarchical data, an attribute-name row for presenting names of attributes composing each tuple in respective levels of the hierarchical data, and a plurality of rows for presenting values of the attributes composing the each tuple in respective levels of the hierarchical data; and the user interface portion immediately displaying the display data generated from the sampling subset.

\* \* \* \* \*